(12) United States Patent
Togashi et al.

(10) Patent No.: US 7,388,738 B1
(45) Date of Patent: Jun. 17, 2008

(54) MULTILAYER CAPACITOR

(75) Inventors: Masaaki Togashi, Tokyo (JP); Chris T. Burket, Huntington Beach, CA (US)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/727,867

(22) Filed: Mar. 28, 2007

(51) Int. Cl.
*H01G 4/228* (2006.01)

(52) U.S. Cl. ............... 361/306.3; 361/306.1; 361/302; 361/311; 361/321.1; 361/321.2

(58) Field of Classification Search ............ 361/306.3, 361/306.1, 301.1, 301.2, 302–305, 307, 308.1, 361/311–313, 321.1, 321.2
See application file for complete search history.

(56) References Cited

U.S. PATENT DOCUMENTS

| | | | |
|---|---|---|---|
| 5,880,925 | A | 3/1999 | DuPre et al. |
| 6,243,253 | B1 | 6/2001 | DuPre et al. |
| 6,430,025 | B2 * | 8/2002 | Naito et al. .................. 361/303 |
| 6,914,767 | B2 * | 7/2005 | Togashi et al. .............. 361/303 |
| 6,934,145 | B2 * | 8/2005 | Hsieh et al. ............. 361/321.2 |
| 6,940,710 | B1 * | 9/2005 | Lee et al. ................. 361/321.2 |
| 7,050,288 | B2 * | 5/2006 | Ahiko et al. ................. 361/303 |
| 7,321,495 | B2 * | 1/2008 | Hayashi et al. ............. 361/761 |

FOREIGN PATENT DOCUMENTS

JP    A 2000-208361    7/2000

* cited by examiner

*Primary Examiner*—Nguyen T Ha
(74) *Attorney, Agent, or Firm*—Oliff & Berridge, PLC

(57) ABSTRACT

A multilayer capacitor comprises a capacitor body; first and second inner electrodes alternately arranged in the capacitor body; and a first outer connecting conductor and first and second terminal electrodes arranged on an outer surface of the capacitor body. Each first inner electrode has a first main electrode portion and a first lead electrode portion for connecting the first main electrode portion to the first outer connecting conductor. Each second inner electrode has a second main electrode portion and a second lead electrode portion for connecting the second main electrode portion to at least one second terminal electrode. The capacitor body includes a first inner connecting conductor arranged outside of at least one set of first and second inner electrodes in the opposing direction of the first and second inner electrodes and connected to at least one first terminal electrode and the first outer connecting conductor.

8 Claims, 17 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a capacitor body in which a plurality of inner electrodes are arranged, and a plurality of terminal electrodes formed on the capacitor body (see Patent Document 1, for example).

Power supplies for central processing units (CPUs) mounted in digital electronic devices have been lowering their voltage while increasing their load current and transient current. This has made it very difficult for fluctuations in power voltage to be held below a tolerable level against drastic changes in load current, whereby a multilayer capacitor known as decoupling capacitor has been connected to the power supply. When the load current transiently fluctuates, this multilayer capacitor supplies a current to the CPU, thereby suppressing the fluctuation in power voltage.

Recently, as the CPU operation frequency has further been increasing, the load current and transient current have been becoming higher and greater, whereby the multilayer capacitors employed as the decoupling capacitors have been demanded to increase their capacity, attain appropriately large equivalent series resistance (ESR), and keep an impedance value which is as constant as possible over a wide frequency band while suppressing equivalent series inductance (ESL).

[Patent Document 1] Japanese Patent Application Laid-Open No. 2000-208361

SUMMARY OF THE INVENTION

However, there is no discussion on the equivalent series resistance of the multilayer capacitor in Patent Document 1.

It is an object of the present invention to provide a multilayer capacitor which can increase the equivalent series resistance.

Meanwhile, main electrode portions of all the inner electrodes in a typical multilayer capacitor are connected to their corresponding terminal electrodes through lead electrode portions. Therefore, a plurality of terminal electrode portions connected to a plurality of terminal electrodes exist at least by the number of inner electrodes, whereby the equivalent series resistance becomes smaller. When the number of inner electrodes arranged in the capacitor body is increased in order to attain a larger capacity, the number of lead electrode portions increases as well. The resistance components of the lead electrode portions connected to the terminal electrodes are connected in parallel to the terminal electrodes, whereby the equivalent series resistance of the multilayer capacitor further decreases as the number of lead electrode portions connected to the terminal electrode portions increases. Thus, demands for greater capacity and greater equivalent series resistance in a multilayer capacitor are contradictory to each other.

Therefore, the inventors conducted diligent studies concerning a multilayer capacitor which can satisfy demands for increasing the capacity and equivalent series resistance. As a result, the inventors have found a new fact that the equivalent series resistance can be increased if inner electrodes are connected to each other through outer connecting conductors formed on a surface of a capacitor body and inner connecting conductors arranged within the capacitor body even when the number of inner electrodes arranged within the capacitor body is held constant. The inventors have also found that the equivalent series resistance of the multilayer capacitor can be adjusted to an appropriate level by connecting only first or second inner electrodes arranged in the capacitor body to a connecting conductor.

In view of the results of the studies, one aspect of the present invention provides a multilayer capacitor comprising a capacitor body having a dielectric characteristic; a plurality of first and second inner electrodes alternately arranged in the capacitor body so as to oppose each other with at least a portion of the capacitor body in between; and a first outer connecting conductor, a plurality of first terminal electrodes, and a plurality of second terminal electrodes arranged on an outer surface of the capacitor body; wherein each of the first inner electrodes has a first main electrode portion for forming a capacitance by cooperating with the second inner electrode and a first lead electrode portion for connecting the first main electrode portion to the first outer connecting conductor; wherein each of the second inner electrodes has a second main electrode portion for forming a capacitance by cooperating with the first inner electrode and a second lead electrode portion for connecting the second main electrode portion to at least one of the plurality of second terminal electrodes; wherein a first inner connecting conductor is arranged outside of at least one set of first and second inner electrodes in the plurality of first and second inner electrodes in the opposing direction of the first and second inner electrodes in the capacitor body; and wherein the first inner connecting conductor is connected to at least one first terminal electrode in the plurality of first terminal electrodes and the first outer connecting conductor.

The multilayer capacitor in accordance with another aspect of the present invention provides a multilayer capacitor comprising a capacitor body having a dielectric characteristic; a plurality of first and second inner electrodes alternately arranged in the capacitor body so as to oppose each other with at least a portion of the capacitor body in between; and first and second outer connecting conductors, a plurality of first terminal electrodes, and a plurality of second terminal electrodes arranged on an outer surface of the capacitor body; wherein each of the first inner electrodes has a first main electrode portion for forming a capacitance by cooperating with the second inner electrode and at least one first lead electrode portion of a first lead electrode portion for connecting the first main electrode portion to the first outer connecting conductor and a first lead electrode portion for connecting the first main electrode portion to the second outer connecting conductor; wherein each of the second inner electrodes has a second main electrode portion for forming a capacitance by cooperating with the first inner electrode and a second lead electrode portion for connecting the second main electrode portion to at least one of the plurality of second terminal electrodes; wherein first and second inner connecting conductors are arranged outside of at least one set of first and second inner electrodes in the plurality of first and second inner electrodes in the opposing direction of the first and second inner electrodes in the capacitor body; wherein the first inner connecting conductor is connected to at least one first terminal electrode in the plurality of first terminal electrodes and the first outer connecting conductor; and wherein the second inner connecting conductor is connected to at least one first terminal electrode in the plurality of first terminal electrodes and the second outer connecting conductor.

Namely, for example, the multilayer capacitor may comprise a capacitor body having a dielectric characteristic; a plurality of first and second inner electrodes alternately arranged in the capacitor body so as to oppose each other with at least a portion of the capacitor body in between; and first and second outer connecting conductors, a plurality of first terminal electrodes, and a plurality of second terminal electrodes arranged on an outer surface of the capacitor body; wherein each of the first inner electrodes has a first main electrode portion for forming a capacitance by cooperating with the second inner electrode, a first lead electrode portion for connecting the first main electrode portion to the first outer connecting conductor, and a first lead electrode portion for connecting the first main electrode portion to the second outer connecting conductor; wherein each of the second inner electrodes has a second main electrode portion for forming a capacitance by cooperating with the first inner electrode and a second lead electrode portion for connecting the second main electrode portion to at least one of the plurality of second terminal electrodes; wherein the capacitor body includes first and second inner connecting conductors arranged outside of at least one set of first and second inner electrodes in the plurality of first and second inner electrodes in the opposing direction of the first and second inner electrodes; wherein the first inner connecting conductor is connected to at least one first terminal electrode in the plurality of first terminal electrodes and the first outer connecting conductor; and wherein the second inner connecting conductor is connected to at least one first terminal electrode in the plurality of first terminal electrodes and the second outer connecting conductor.

Alternatively, for example, the multilayer capacitor may comprise a capacitor body having a dielectric characteristic; a plurality of first and second inner electrodes alternately arranged in the capacitor body so as to oppose each other with at least a portion of the capacitor body in between; and first and second outer connecting conductors, a plurality of first terminal electrodes, and a plurality of second terminal electrodes arranged on an outer surface of the capacitor body; wherein each of a first number of first inner electrodes which is at least one (1) but smaller than the total number of the plurality of first inner electrodes has a first main electrode portion for forming a capacitance by cooperating with the second inner electrode and a first lead electrode portion for connecting the first main electrode portion to the first outer connecting conductor; wherein each of a second number of first inner electrodes which is smaller than the total number of the plurality of first inner electrodes by the first number has a first main electrode portion for forming a capacitance by cooperating with the second inner electrode and a first lead electrode portion for connecting the first main electrode portion to the second outer connecting conductor; wherein each of the second inner electrodes has a second main electrode portion for forming a capacitance by cooperating with the first inner electrode and a second lead electrode portion for connecting the second main electrode portion to at least one of the plurality of second terminal electrodes; wherein the capacitor body includes first and second inner connecting conductors arranged outside of at least one set of first and second inner electrodes in the plurality of first and second inner electrodes in the opposing direction of the first and second inner electrodes; wherein the first inner connecting conductor is connected to at least one first terminal electrode in the plurality of first terminal electrodes and the first outer connecting conductor; and wherein the second inner connecting conductor is connected to at least one first terminal electrode in the plurality of first terminal electrodes and the second outer connecting conductor.

In these multilayer capacitors, the first inner electrodes are not directly connected to the first terminal electrodes. Instead, the first inner electrodes of these multilayer capacitors are electrically connected to each other through the outer and inner connecting conductors. Thus by connecting the first inner electrodes to the first terminal electrodes not physically but electrically through the connecting conductors, the above-mentioned multilayer capacitors can increase the equivalent series resistance.

Preferably, the second main electrode portion of each of the second inner electrodes is connected to only one (1) second terminal electrode in the plurality of second terminal electrodes through the second lead electrode portion of the second inner electrode.

In this case, the second main electrode portion of each second inner electrode is connected to one (1) second terminal electrode by one (1) second lead electrode portion. Therefore, this multilayer capacitor can increase the equivalent series resistance.

Alternatively, it will be preferred that if each second inner electrode has second lead electrode portions of at least the same number as that of the plurality of second terminal electrodes, the second main electrode portion of the second inner electrode being connected to the plurality of second terminal electrodes through the plurality of second lead electrode portions of the second inner electrode.

In this case, each second inner electrode includes second lead electrode portions equal to or greater than the number of the second terminal electrodes. This can lower the equivalent series resistance.

Preferably, at least a part of the plurality of first and second terminal electrodes are alternately arranged on the outer surface of the capacitor body when seen in the opposing direction of the one set of first and second inner electrodes.

In this case, terminal electrodes adjacent to each other can be connected to polarities different from each other, whereby the equivalent series inductance can be made smaller.

The present invention can provide a multilayer capacitor which can increase the equivalent series resistance in a highly controlled manner.

The present invention will become more fully understood from the detailed descriptions given hereinbelow and the accompanying drawings which are given by way of illustration only, and thus are not to be considered as limiting the present invention.

Further scope of applicability of the present invention will become apparent from the detailed descriptions given hereinafter. However, it should be understood that the detailed descriptions and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanations, the same constituents or those having the same functions will be referred to with the same numerals without repeating their overlapping descriptions.

First Embodiment

Figure 1:
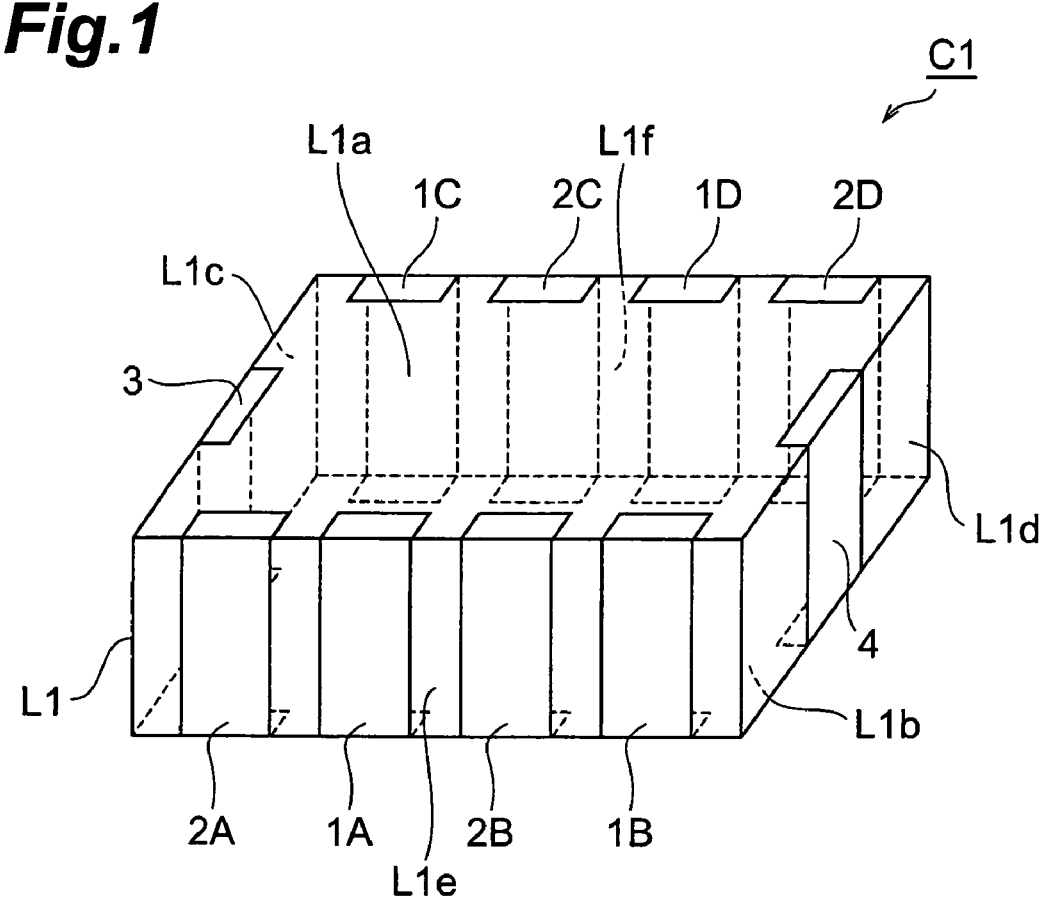
FIG. 1 is a perspective view of a multilayer capacitor in accordance with a first embodiment.
Figure 2:
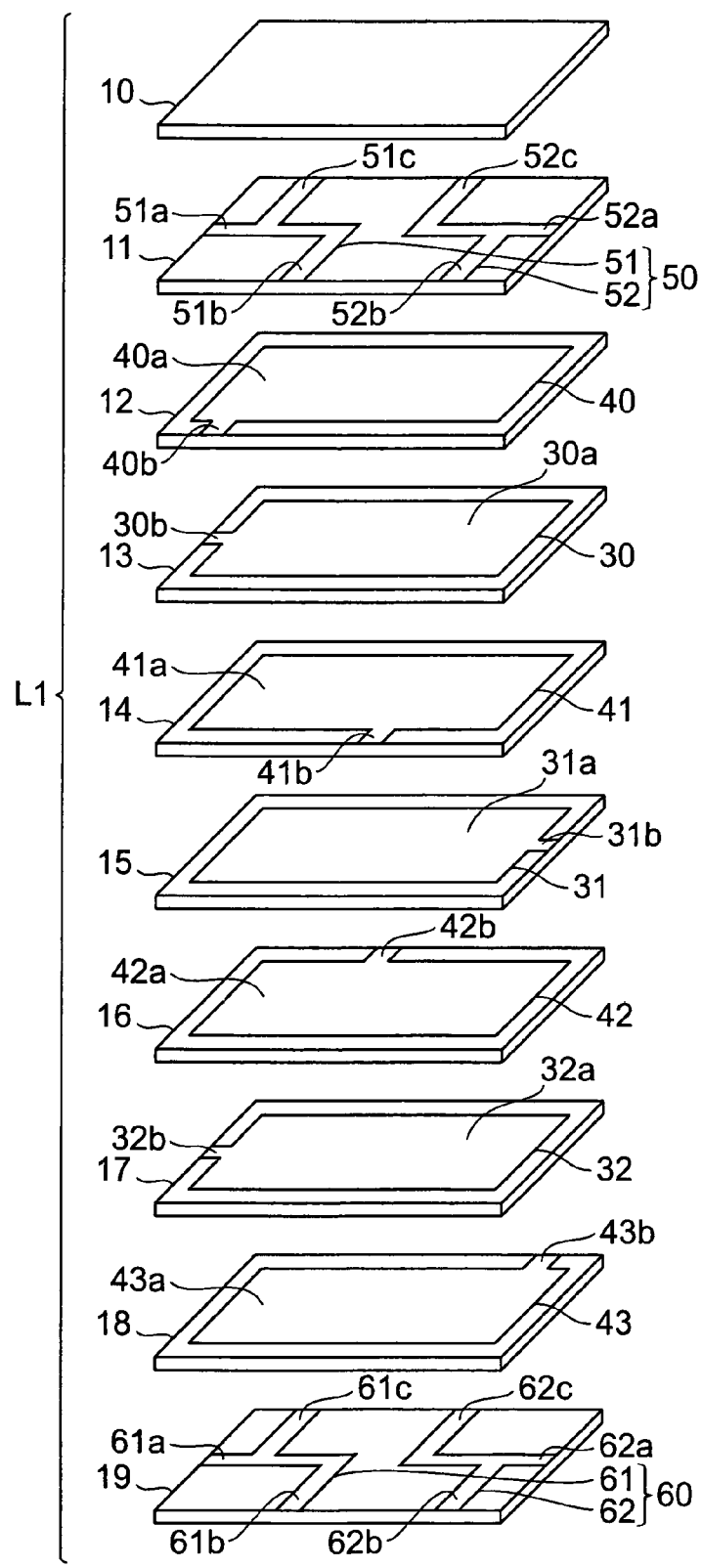
FIG. 2 is an exploded perspective view of the capacitor body included in the multilayer capacitor in accordance with the first embodiment.

To begin with, the structure of a multilayer capacitor C1 in accordance with a first embodiment will be explained with reference to FIGS. 1 and 2. FIG. 1 is a perspective view of the multilayer capacitor in accordance with the first embodiment. FIG. 2 is an exploded perspective view of the capacitor body included in the multilayer capacitor in accordance with the first embodiment.

As shown in FIG. 1, the multilayer capacitor C1 comprises a capacitor body L1 shaped like a rectangular parallelepiped, and a plurality of (4 in this embodiment) first terminal electrodes 1A to 1D, a plurality of (4 in this embodiment) second terminal electrodes 2A to 2D, a first outer connecting conductor 3, and a second outer connecting conductor 4 which are arranged on the outer surface of the capacitor body L1. The capacitor body L1 includes oblong first and second main faces L1a and L1b opposing each other, first and second end faces L1c and L1d opposing each other, and first and second side faces L1e and L1f opposing each other. The first and second end faces L1c, L1d extend in the shorter side direction of the first and second main faces L1a, L1b so as to connect the first and second main faces L1a, L1b to each other. The first and second side faces L1e, L1f extend in the longer side direction of the first and second main faces L1a, L1b so as to connect the first and second main faces L1a, L1b to each other.

The first terminal electrodes 1A, 1B and second terminal electrodes 2A, 2B are arranged on the first side face L1e of the capacitor body L1. The first terminal electrodes 1A, 1B and second terminal electrodes 2A, 2B are arranged on the first side face L1e in the order of the second terminal electrode 2A, first terminal electrode 1A, second terminal electrode 2B, and first terminal electrode 1B from the first end face L1c side to the second end face L1d side.

Namely, the first and second terminal electrodes 1A, 1B, 2A, 2B, which are a part of the first and second terminal electrodes 1A to 1D, 2A to 2D, are alternately arranged on the first side face L1e when seen in the opposing direction of the first and second main faces L1a, L1b.

The first terminal electrodes 1C, 1D and second terminal electrodes 2C, 2D are arranged on the second side face L1f of the capacitor body L1. The first terminal electrodes 1C, 1D and second terminal electrodes 2C, 2D are arranged on the first side face L1f in the order of the first terminal electrode 1C, second terminal electrode 2C, first terminal electrode 1D, and second terminal electrode 2D from the first end face L1c side to the second end face L1d side.

Namely, the first and second terminal electrodes 1C, 1D, 2C, 2D, which are a part of the first and second terminal electrodes 1A to 1D, 2A to 2D, are alternately arranged on the second side face L1f when seen in the opposing direction of the first and second main faces L1a, L1b.

The first outer connecting conductor 3 is arranged on the first end face L1c of the capacitor body L1. The second outer connecting conductor 4 is arranged on the second end face L1d of the capacitor body L1. The first and second terminal electrodes 1A to 1D, 2A to 2D, and first and second outer connecting conductors 3, 4 are formed, for example, by providing a conductive paste containing a conductive metal powder and glass frit onto their corresponding surfaces of the outer surface of the capacitor body L1 and baking it. If necessary, a plating layer may be formed on the baked electrodes.

As shown in FIG. 2, the capacitor body L1 has a plurality of (10 in this embodiment) dielectric layers 10 to 19, a plurality of (3 in this embodiment) first inner electrodes 30 to 32, and a plurality of (4 in this embodiment) second inner electrodes 40 to 43. The capacitor body L1 further includes a plurality of (2 in this embodiment) inner connecting conductor layers 50, 60. The plurality of first and second inner electrodes 30 to 32, 40 to 43 are alternately arranged with the dielectric layers 12 to 17 in between. The inner connecting conductor layers 50, 60 are arranged outside of the alternately arranged first and second inner electrodes 30 to 32, 40 to 43 in the opposing direction of the first and second main faces L1a, L1b. The first and second inner electrodes 30 to 32, 40 to 43 alternately arranged with the dielectric layers 12 to 17 are positioned between the inner connecting conductor layers 50 and 60.

The dielectric layers 10 to 19 extend in directions parallel to the first and second main faces L1a, L1b and are laminated in the opposing direction of the first and second main faces L1a, L1b. Each of the dielectric layers 10 to 19 is constituted by a sintered body of a ceramic green sheet containing a dielectric ceramic, for example. In the actual multilayer capacitor C1, the dielectric layers 10 to 19 are integrated to such an extent that their boundaries are invisible.

The first inner electrodes 30 to 32 and second inner electrodes 40 to 43 are alternately laminated in the laminating direction of the dielectric layers 10 to 19, i.e., in the opposing direction of the first and second main faces L1a, L1b, in the capacitor body L1. The first and second inner electrodes 30 to 32, 40 to 43 are arranged so as to oppose each other with at least one of the dielectric layers 12 to 17 in between. Each of the first and second inner electrodes 30 to 32, 40 to 43 is constituted by a sintered body of a conductive paste, for example.

The first inner electrodes 30 to 32 include main electrode portions (first main electrode portions) 30a to 32a and lead electrode portions (first lead electrode portions) 30b to 32b. Each of the main electrode portions 30a to 32a has an oblong form whose longer side direction is the longer side direction of the first and second main faces L1a, L1b.

The lead electrode portions 30b, 32b of two first inner electrodes 30, 32 whose number (first number) is at least 1 but smaller than the total number of the first inner electrodes (3 in this embodiment) extend from the edges of the main electrode portions 30a, 32a on the first end face L1c side to the first end face L1c, so as to be drawn to the first end face L1c. The lead electrode portions 30b, 32b are connected to the first outer connecting conductor 3 electrically and physically.

The lead electrode portion 31b of one first inner electrode 31 whose number (second number) is smaller than the total number of the first inner electrodes (3 in this embodiment) by the first number, i.e., 2, extends from the edge of the main electrode portion 31a on the second end face L1d side to the second end face L1d, so as to be drawn to the second end face L1d. The lead electrode portion 31b is connected to the second outer connecting conductor 4 electrically and physically.

The second inner electrodes 40 to 43 include main electrode portions (second main electrode portions) 40a to 43a and lead electrode portions (second lead electrode portions) 40b to 43b. Each of the main electrode portions 40a to 43a has an oblong form whose longer side direction is the longer side direction of the first and second main faces L1a, L1b.

The lead electrode portion 40b of the second inner electrode 40 extends from the edge of the main electrode portion 40a on the first side face L1e side to the first side face L1e, so as to be drawn to the first side face L1e. The lead electrode portion 40b is connected to the second terminal electrode 2A electrically and physically.

The lead electrode portion 41b of the second inner electrode 41 extends from the edge of the main electrode portion 41a on the first side face L1e side to the first side face L1e, so as to be drawn to the first side face L1e. The lead electrode portion 41b is connected to the second terminal electrode 2B electrically and physically.

The lead electrode portion 42b of the second inner electrode 42 extends from the edge of the main electrode portion 42a on the second side face L1f side to the second side face L1f, so as to be drawn to the second side face L1f. The lead electrode portion 42b is connected to the second terminal electrode 2C electrically and physically.

The lead electrode portion 43b of the second inner electrode 43 extends from the edge of the main electrode portion 43a on the second side face L1f side to the second side face L1f, so as to be drawn to the second side face L1f. The lead electrode portion 43b is connected to the second terminal electrode 2D electrically and physically.

Thus, the main electrode portions 40a to 43a of the second inner electrodes 40 to 43 are each connected to only one second terminal electrode in the plurality of terminal electrodes 2A to 2D through the lead electrode portions 40b to 43b.

The main electrode portions 30a to 32a of the first inner electrodes 30 to 32 and the main electrode portions 40a to 43a of the second inner electrodes 40 to 43 oppose each other with the dielectric layers 12 to 17 in between. Therefore, the main electrode portions 30a to 32a of the first inner electrodes 30 to 32 and the main electrode portions 40a to 43a of the second inner electrodes 40 to 43 cooperate with each other, so as to form a predetermined capacitance component.

The inner connecting conductor layers 50, 60 have first inner connecting conductors 51, 61 and second inner connecting conductors 52, 62. In the inner connecting conductor layer 50, the first and second inner connecting conductors 51, 52 are oriented in such a way as to be along the opposing direction of the first and second end faces L1c, L1d. In the inner connecting conductor layer 60, the first and second inner connecting conductors 61, 62 are oriented in such a way as to be along the opposing direction of the first and second end faces L1c, L1d.

The first inner connecting conductors 51, 61 include first conductor portions 51a, 61a, second conductor portions 51b, 61b, and third conductor portions 51c, 61c. Each of the first conductor portions 51a, 61a has an oblong form whose longer side direction is the longer side direction of the first and second main faces L1 a, L1b. The longer sides of the first conductor portions 51a, 61a extend from positions corresponding to the first terminal electrode 1A to the first end face L1c when seen in the opposing direction of the first and second main faces L1a, L1b. The first conductor portions 51a, 61a are drawn to the first end face L1c. The first conductor portions 51a, 61a are connected to the first outer connecting conductor 3 electrically and physically.

The shorter sides of the first conductor portions 51a, 61a are located at positions corresponding to the first outer connecting conductor 3 when seen in the opposing direction of the first and second main faces L1a, L1b. The electrical path length on inner connecting conductor layer 50, of first inner connecting conductor 51 from first terminal electrode 1C to first outer connecting conductor 3 and from first terminal electrode 1A to first outer connecting conductor 3 is kept constant to ensure an equivalent resistance. The same holds true for second inner connecting conductor 52 from first terminal electrode 1D to second outer connecting conductor 4 and from first terminal electrode 1B to second outer connecting conductor 4. The same for all the inner conductors 61, 62 on inner connecting conductor layer 60.

The second conductor portions 51b, 61b of the first inner connecting conductors 51, 61 extend from the end portions on the second end face L1d side in the longer sides and on the first side face L1e side of the first conductor portions 51a, 61a to the first side face L1e, so as to be drawn to the first side face L1e. The second conductor portions 51b, 61b are connected to the first terminal electrode 1A electrically and physically.

The third conductor portions 51c, 61c of the first inner connecting conductors 51, 61 extend from the longer sides on the second side face L1f of the first conductor portions 51a, 61a to the second side face L1f, so as to be drawn to the second side face L1f. The third conductor portions 51c, 61c are connected to the first terminal electrode 1C electrically and physically.

The lengths of the second conductor portion 51b and the third conductor portion 51c in the opposing direction of the first and second end faces L1c, L1d are same. The lengths of the second conductor portion 61b and the third conductor portion 61c in the opposing direction of the first and second end faces L1c, L1d are same. The lengths of the second conductor portion 51b and the third conductor portion 51c in the opposing direction of the first and second side faces L1e, L1f are same. The lengths of the second conductor portion 61b and the third conductor portion 61c in the opposing direction of the first and second side faces L1e, L1f are same.

The second inner connecting conductors 52, 62 include fourth conductor portions 52a, 62a, fifth conductor portions 52b, 62b, and sixth conductor portions 52c, 62c. Each of the fourth conductor portions 52a, 62a has an oblong form whose longer side direction is the longer side direction of the first and second main faces L1a, L1b. The longer sides of the fourth conductor portions 52a, 62a extend from positions corresponding to the first terminal electrode 1D to the second end face L1d when seen in the opposing direction of the first and second main faces L1a, L1b. The fourth conductor portions 52a, 62a are drawn to the second end face L1d. The fourth conductor portions 52a, 62a are connected to the second outer connecting conductor 4 electrically and physically.

The shorter sides of the fourth conductor portions 52a, 62a are located at positions corresponding to the second outer connecting conductor 4 when seen in the opposing direction of the first and second main faces L1a, L1b.

The fifth conductor portions 52b, 62b of the second inner connecting conductors 52, 62 extend from the longer sides on the first side face L1e side of the fourth conductor portions 52a, 62a to the first side face L1e, so as to be drawn to the first side face L1e. The fifth conductor portions 52b, 62b are connected to the first terminal electrode 1B electrically and physically.

The sixth conductor portions 52c, 62c of the second inner connecting conductors 52, 62 extend from the end portions on the first end face L1c side in the longer sides and on the second side face L1f side of the fourth conductor portions 52a, 62a, so as to be drawn to the second side face L1f. The sixth conductor portions 52c, 62c are connected to the first terminal electrode 1D electrically and physically.

The lengths of the fifth conductor portion 52b and the sixth conductor portion 52c in the opposing direction of the first and second end faces L1c, L1d are same. The lengths of the fifth conductor portion 62b and the sixth conductor portion 62c in the opposing direction of the first and second end faces L1c, L1d are same. The lengths of the fifth conductor portion 52b and the sixth conductor portion 52c in the opposing direction of the first and second side faces L1e, L1f are same. The lengths of the fifth conductor portion 62b and the sixth conductor portion 62c in the opposing direction of the first and second side faces L1e, L1f are same.

The main electrode portions 30a, 32a of the first inner electrodes 30, 32 are electrically connected to the first terminal electrodes 1A, 1C through the first outer connecting conductor 3 and first inner connecting conductors 51, 61. The main electrode portion 31a of the first inner electrode 31 is electrically connected to the first terminal electrodes 1B, 1D through the second outer connecting conductor 4 and second inner connecting conductors 52, 62.

In the multilayer capacitor C1, the first inner electrodes 30 to 32 are not directly connected to the first terminal electrodes 1A to 1D. Instead, the first inner electrodes 30, 32 of the multilayer capacitor C1 are electrically connected to the first terminal electrodes 1A, 1C through the first outer connecting conductor 3 and first inner connecting conductors 51, 61. The first inner electrode 31 of the multilayer capacitor C1 is electrically connected to the first terminal electrodes 1B, 1D through the second outer connecting conductor 4 and second inner connecting conductors 52, 62. As a result, the multilayer capacitor C1 can increase the equivalent series resistance as compared with a conventional multilayer capacitor in which all the first inner electrodes are physically connected to the first terminal electrodes.

In particular, the second inner electrodes 40 to 43 are directly physically connected to the second terminal electrodes 2A to 2D in the multilayer capacitor C1. Therefore, the equivalent series resistance of the multilayer capacitor C1 can be increased to an appropriate level, i.e., to such an extent that it is not excessively large.

In the multilayer capacitor C1, the main electrode portions of the second inner electrodes are connected to the respective second terminal electrodes 2A to 2D by the respective electrode portions 40b to 43b. Therefore, the multilayer capacitor C1 can further increase the equivalent series resistance.

Since the lengths in the opposing direction of the first and second end faces L1c, L1d and the lengths in the opposing direction of the first and second side faces L1e, L1f of the second conductor portions 51b, 61b are respectively equal to the corresponding lengths of the third conductor portion 51c, 61c, each of the ESR (equivalent series resistance) and ESL (equivalent series inductance) is consistent no matter what electrical path is used with respect to the first inner connecting conductors 51, 61. Since the lengths in the opposing direction of the first and second end faces L1c, L1d and the lengths in the opposing direction of the first and second side faces L1e, L1f of the fifth conductor portions 52b, 62b are respectively equal to the corresponding lengths of the sixth conductor portion 52c, 62c, each of the ESR and ESL is consistent no matter what electrical path is used with respect to the second inner connecting conductors 52, 62. This configuration enables to tightly control the equivalent series resistance value of the multilayer capacitor C1.

In the multilayer capacitor C1, the first and second terminal electrodes 1A, 1B, 2A, 2B are alternately arranged on the first side face L1e when seen in the opposing direction of the first and second main faces L1a, L1b. In this case, terminal electrodes adjacent to each other can be connected to different polarities on the first side face L1e, whereby the equivalent series inductance can be made smaller.

In the multilayer capacitor C1, the first and second terminal electrodes 1C, 1D, 2C, 2D are alternately arranged on the second side face L1f when seen in the opposing direction of the first and second main faces L1a, L1b. Therefore, terminal electrodes adjacent to each other can be connected to different polarities on the second side face L1f, whereby the equivalent series inductance can be made further smaller.

The inner connecting conductor layers 50, 60 are respectively arranged at both sides of outside of the first and second inner electrodes 30 to 32, 40 to 43 in the opposing direction of the first and second main faces L1a, L1b. Since the inner connecting conductor layers 50, 60 are thus arranged at a position almost symmetrical to each other in the opposing direction of the first and second main faces L1a, L1b, the multilayer capacitor C1 can be mounted in conformity to mounting directions relating to the opposing direction of the first and second main faces L1a, L1b. Therefore, the multilayer capacitor C1 can be mounted easily.

Second Embodiment

Figure 3:
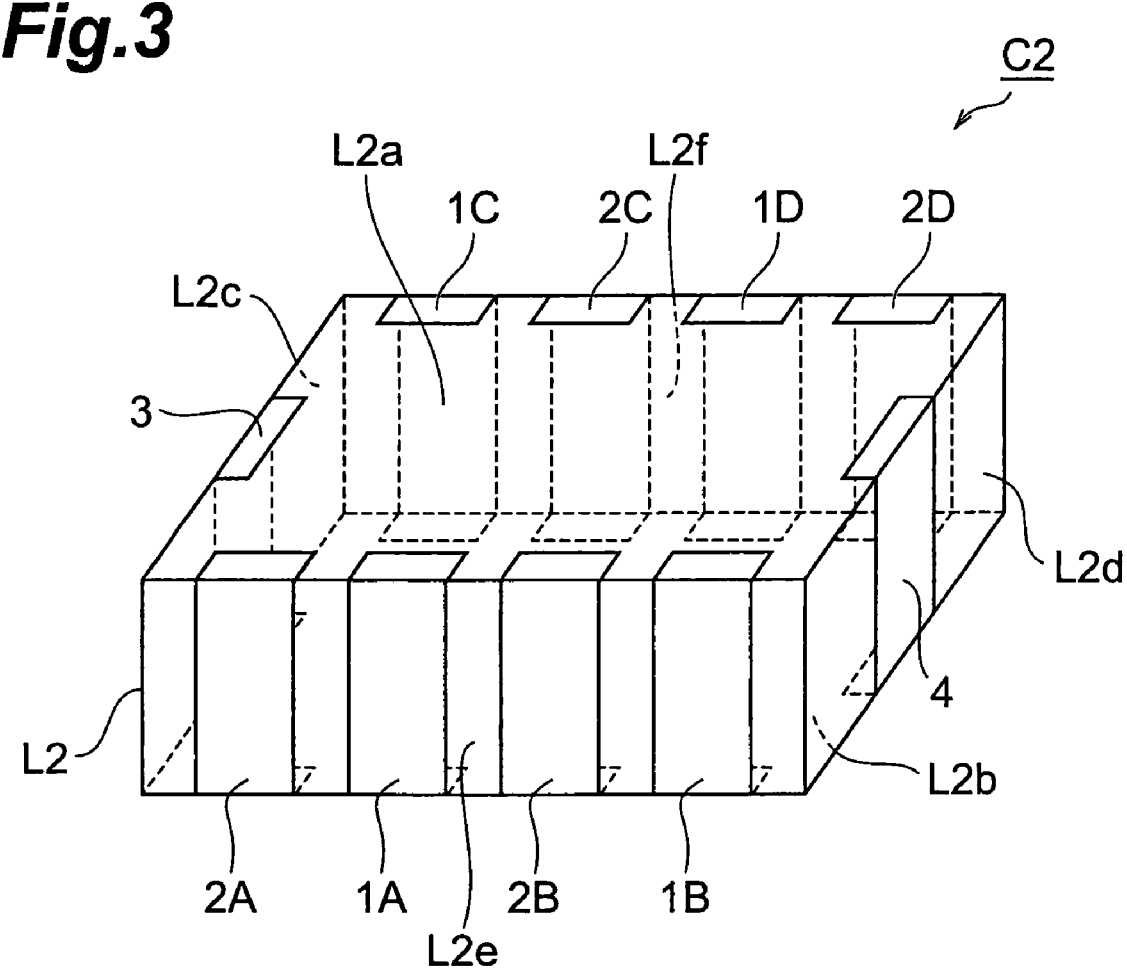
FIG. 3 is a perspective view of a multilayer capacitor in accordance with a second embodiment.
Figure 4:
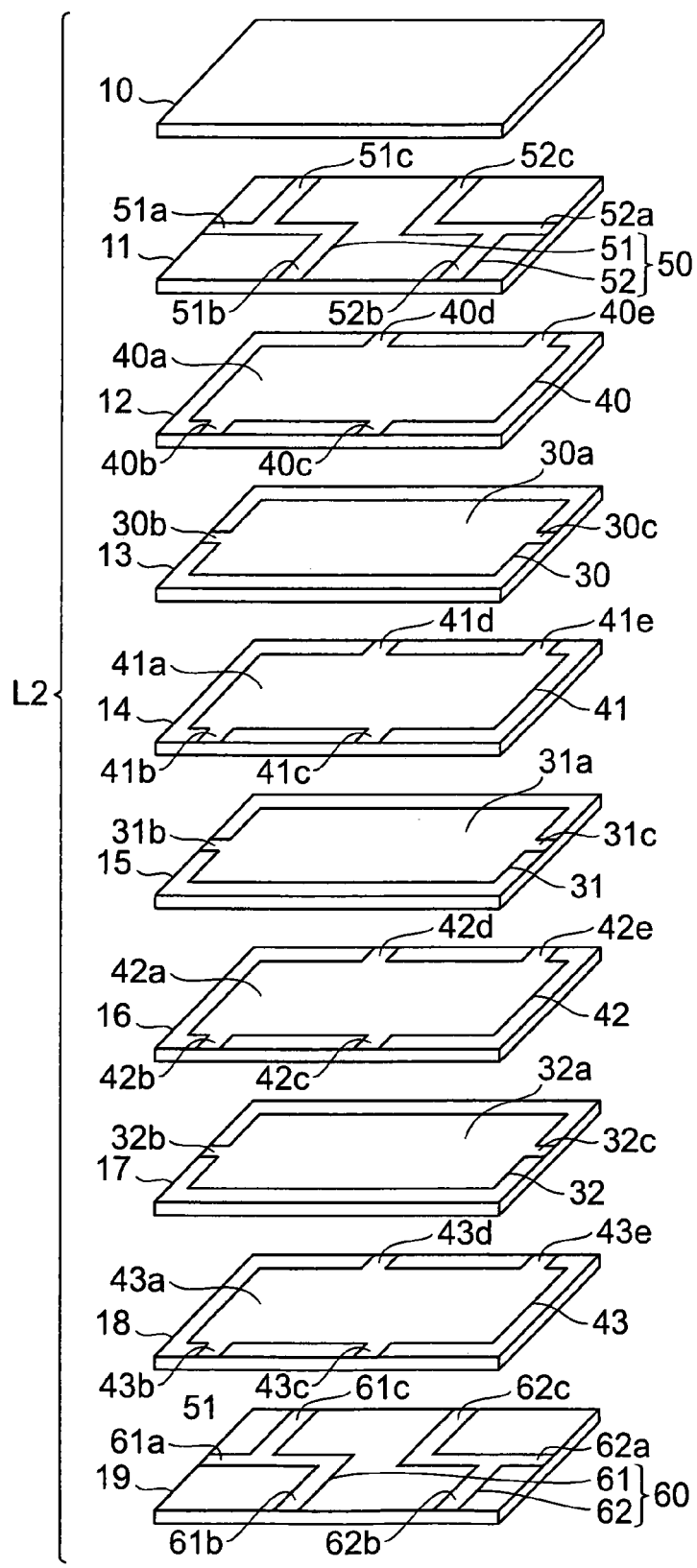
FIG. 4 is an exploded perspective view of the capacitor body included in the multilayer capacitor in accordance with the second embodiment.

With reference to FIGS. 3 and 4, the structure of a multilayer capacitor in accordance with a second embodiment will be explained. The multilayer capacitor C2 in accordance with the second embodiment differs from the multilayer capacitor C1 in accordance with the first embodiment in terms of how the second inner electrodes are connected to the second terminal electrodes. FIG. 3 is a perspective view of the multilayer capacitor in accordance with the second embodiment. FIG. 4 is an exploded perspective view of the capacitor body included in the multilayer capacitor in accordance with the second embodiment.

As shown in FIG. 3, the multilayer capacitor C2 comprises a capacitor body L2 shaped like a rectangular parallelepiped, and a plurality of (4 in this embodiment) first terminal electrodes 1A to 1D, a plurality of (4 in this embodiment) second terminal electrodes 2A to 2D, a first outer connecting conductor 3, and a second outer connecting conductor 4 which are arranged on the outer surface of the capacitor body L2. The capacitor body L2 includes oblong first and second main faces L2a and L2b opposing each other, first and second end faces L2c and L2d opposing each other, and first and second side faces L2e and L2f opposing each other. The first and second end faces L2c, L2d extend in the shorter side direction of the first and second main faces L2a, L2b so as to connect the first and second main faces L2a, L2b to each other. The first and second side faces L2e, L2f extend in the longer side direction of the first and second main faces L2a, L2b so as to connect the first and second main faces L2a, L2b to each other.

On the first side face L2e of the capacitor body L2, the first terminal electrodes 1A, 1B and second terminal electrodes 2A, 2B are arranged in the order of the second terminal electrode 2A, first terminal electrode 1A, second terminal electrode 2B, and first terminal electrode 1B from the first end face L2c side to the second end face L2d side. Namely, the first and second terminal electrodes 1A, 1B, 2A, 2B are alternately arranged on the first side face L2e when seen in the opposing direction of the first and second main faces L2a, L2b.

On the second side face L2f of the capacitor body L2, the first terminal electrodes 1C, 1D and second terminal electrodes 2C, 2D are arranged in the order of the first terminal electrode 1C, second terminal electrode 2C, first terminal electrode 1D, and second terminal electrode 2D from the first end face L2c side to the second end face L2d side. Namely, the first and second terminal electrodes 1C, 1D, 2C, 2D are alternately arranged on the second side face L2f when seen in the opposing direction of the first and second main faces L2a, L2b.

The first outer connecting conductor 3 is arranged on the first end face L2c of the capacitor body L2. The second outer connecting conductor 4 is arranged on the second end face L2d of the capacitor body L2.

As shown in FIG. 4, the capacitor body L2 has a plurality of (10 in this embodiment) dielectric layers 10 to 19, a plurality of (3 in this embodiment) first inner electrodes 30 to 32, and a plurality of (4 in this embodiment) second inner electrodes 40 to 43. The capacitor body L2 further includes a plurality of (2 in this embodiment) inner connecting conductor layers 50, 60. The plurality of first and second inner electrodes 30 to 32, 40 to 43 are alternately arranged with the dielectric layers 12 to 17. The inner connecting conductor layers 50, 60 are arranged outside of the alternately arranged first and second inner electrodes 30 to 32, 40 to 43 in the opposing direction of the first and second main faces L2a, L2b. The first and second inner electrodes 30 to 32, 40 to 43 alternately arranged with the dielectric layers 12 to 17 are positioned between the inner connecting conductor layers 50 and 60.

In the capacitor body L2, the first and second inner electrodes 30 to 32, 40 to 43 are alternately arranged in the laminating direction of the dielectric layers 10 to 19, i.e., in the opposing direction of the first and second main faces L2a, L2b. The first and second inner electrodes 30 to 32, 40 to 43 are arranged such as to oppose each other with at least one of the dielectric layers 12 to 17 in between.

The first inner electrodes 30 to 32 include main electrode portions 30a to 32a, lead electrode portions 30b to 32b, and lead electrode portions 30c to 32c. Each of the main electrode portions 30a to 32a has an oblong form whose longer side direction is the longer side direction of the first and second main faces L2a, L2b.

The lead electrode portions 30b to 32b of the plurality of first inner electrodes 30 to 32 extend from the edges on the first end face L2c side of the main electrode portions 30a to 32a to the first end face L2c, so as to be drawn to the first end face L2c. The lead electrode portions 30b to 32b are connected to the first outer connecting conductor 3 electrically and physically.

The lead electrode portions 30c to 32c of the plurality of first inner electrodes 30 to 32 extend from the edges on the second end face L2d side of the main electrode portions 30a to 32a to the second end face L2d, so as to be drawn to the second end face L2d. The lead electrode portions 30c to 32c are connected to the second outer connecting conductor 4 electrically and physically.

The second inner electrodes 40 to 43 include main electrode portions 40a to 43a, lead electrode portions 40b to 43b, lead electrode portions 40c to 43c, lead electrode portions 40d to 43d, and lead electrode portions 40e to 43e. Namely, each of the second inner electrodes 40 to 43 includes the lead electrode portions by the same number (4 in this embodiment) as that of the second terminal electrodes 2A to 2D. Each of the main electrode portions 40a to 43a has an oblong form whose longer side direction is the longer side direction of the first and second main faces L2a, L2b.

The lead electrode portions 40b to 43b of the second inner electrodes 40 to 43 extend from the edges on the first side face L2e side of the main electrode portions 40a to 43a to the first side face L2e, so as to be drawn to the first side face L2e. The lead electrode portions 40b to 43b are connected to the second terminal electrode 2A electrically and physically.

The lead electrode portions 40c to 43c of the second inner electrodes 40 to 43 extend from the edges on the first side face L2e side of the main electrode portions 40a to 43a to the first side face L2e, so as to be drawn to the first side face L2e. The lead electrode portions 40c to 43c are connected to the second terminal electrode 2B electrically and physically.

The lead electrode portions 40d to 43d of the second inner electrodes 40 to 43 extend from the edges on the second side face L2f side of the main electrode portions 40a to 43a to the second side face L2f, so as to be drawn to the second side face L2f. The lead electrode portions 40d to 43d are connected to the second terminal electrode 2C electrically and physically.

The lead electrode portions 40e to 43e of the second inner electrodes 40 to 43 extend from the edges on the second side face L2f side of the main electrode portions 40a to 43a to the second side face L2f, so as to be drawn to the second side face L2f. The lead electrode portions 40e to 43e are connected to the second terminal electrode 2D electrically and physically.

Therefore, in the second inner electrodes 40 to 43, the lead electrode portions 40b to 43b, 40c to 43c are arranged in the order of the lead electrode portions 40b to 43b, 40c to 43c from the first end face L2c side to the second end face L2d side when seen in the opposing direction of the first and second main faces L2a, L2b. In the second inner electrodes 40 to 43, the lead electrode portions 40d to 43d, 40e to 43e are arranged in the order of the lead electrode portions 40d to 43d, 40e to 43e from the first end face L2c side to the second end face L2d side when seen in the opposing direction of the first and second main faces L2a, L2b.

Thus, the main electrode portions 40a to 43a of the second inner electrodes 40 to 43 are connected to each of the plurality of second terminal electrodes 2A to 2D through the plurality of lead electrode portions 40b to 43b, 40c to 43c, 40d to 43d, 40e to 43e of the second inner electrodes 40 to 43.

The main electrode portions 30a to 32a of the first inner electrodes 30 to 32 and the main electrode portions 40a to 43a of the second inner electrodes 40 to 43 oppose each other with the dielectric layers 12 to 17 in between. Therefore, the main electrode portions 30a to 32a of the first inner electrodes 30 to 32 and the main electrode portions 40a to 43a of the second inner electrodes 40 to 43 cooperate with each other, so as to form a predetermined capacitance component.

The inner connecting conductor layers 50, 60 have first inner connecting conductors 51, 61 and second inner connecting conductors 52, 62. The first and second inner connecting conductors 51, 61, 52, 62 are oriented in such a way as to be along the opposing direction of the first and second end faces L2c, L2d. Specifically, the first inner connecting conductors 51, 61 are positioned on the first end face L2c side, whereas the second inner connecting conductors 52, 62 are positioned on the second end face L2d side.

As with the first inner connecting conductors 51, 61 of the multilayer capacitor C1 in accordance with the first embodiment, the first inner connecting conductors 51, 61 of the multilayer capacitor C2 include oblong first conductor portions 51a, 61a, second conductor portions 51b, 61b, and third conductor portions 51c, 61c. The first conductor portions 51a, 61a are connected to the first outer connecting conductor 3 electrically and physically. The second conductor portions 51b, 61b are connected to the first terminal electrode 1A electrically and physically. The third conductor portions 51c, 61c are connected to the first terminal electrode 1C electrically and physically.

The lengths of the second and third conductor portions 51b, 61b, 51c, 61c in the opposing direction of the first and second end faces L1c, L1d are same. The lengths of the second and third conductor portions 51b, 61b, 51c, 61c in the opposing direction of the first and second side faces L1e, L1f are same.

As with the second inner connecting conductors 52, 62 of the multilayer capacitor C1 in accordance with the first embodiment, the second inner connecting conductors 52, 62 of the multilayer capacitor C2 include oblong fourth conductor portions 52a, 62a, fifth conductor portions 52b, 62b, and sixth conductor portions 52c, 62c. The fourth conductor portions 52a, 62a are connected to the second outer connecting conductor 4 electrically and physically. The fifth conductor portions 52b, 62b are connected to the first terminal electrode 1B electrically and physically. The sixth conductor portions 52c, 62c are connected to the first terminal electrode 1D electrically and physically. The lengths of the fifth and sixth conductor portions 52b, 62b, 52c, 62c in the opposing direction of the first and second end faces L1c, L1d are same. The lengths of the fifth and sixth conductor portions 52b, 62b, 52c, 62c in the opposing direction of the first and second side faces L1e, L1f are same.

The main electrode portions 30a to 32a of the first inner electrodes 30 to 32 are electrically connected to the first terminal electrodes 1A, 1C through the first outer connecting conductor 3 and first inner connecting conductors 51, 61. The main electrode portions 30a to 32a of the first inner electrodes 30 to 32 are also electrically connected to the first terminal electrodes 1B, 1D through the second outer connecting conductor 4 and second inner connecting conductors 52, 62.

In the multilayer capacitor C2, the first inner electrodes 30 to 32 are not directly connected to the first terminal electrodes 1A to 1D. Instead, the first inner electrodes 30 to 32 of the multilayer capacitor C2 are electrically connected to the first terminal electrodes 1A, 1C through the first outer connecting conductor 3 and first inner connecting conductors 51, 61. The first inner electrodes 30 to 32 of the multilayer capacitor C2 are also electrically connected to the first terminal electrodes 1B, 1D through the second outer connecting conductor 4 and second inner connecting conductors 52, 62. As a result, the multilayer capacitor C2 can increase the equivalent series resistance as compared with a conventional multilayer capacitor in which all the first inner electrodes are physically connected to the first terminal electrodes.

In particular, the second inner electrodes 40 to 43 are directly physically connected to the second terminal electrodes 2A to 2D in the multilayer capacitor C2. Therefore, the equivalent series resistance of the multilayer capacitor C2 can be increased to an appropriate level, i.e., to such an extent that it is not excessively large.

In the multilayer capacitor C2, each of the second inner electrodes 40 to 43 includes a plurality of (4 in this embodiment) lead electrode portions 40b to 43b, 40c to 43c, 40d to 43d, 40e to 43e. Therefore, the equivalent series resistance can be controlled correspondingly. This makes it possible to increase the equivalent series resistance of the multilayer capacitor C2 to an appropriate level, i.e., to such an extent that it is not excessively large.

In the multilayer capacitor C2, the first and second terminal electrodes 1A, 1B, 2A, 2B are alternately arranged on the first side face L2e when seen in the opposing direction of the first and second main faces L2a, L2b. In this case, terminal electrodes adjacent to each other can be connected to different polarities on the first side face L2e, whereby the equivalent series inductance can be made smaller.

In the multilayer capacitor C2, the first and second terminal electrodes 1C, 1D, 2C, 2D are alternately arranged on the second side face L2f when seen in the opposing direction of the first and second main faces L2a, L2b. Therefore, terminal electrodes adjacent to each other can be connected to different polarities on the second side face L2f, whereby the equivalent series inductance can be made further smaller.

The inner connecting conductor layers 50, 60 are respectively arranged at both sides of outside of the first and second inner electrodes 30 to 32, 40 to 43 in the opposing direction of the first and second main faces L2a, L2b. Since the inner connecting conductor layers 50, 60 are thus arranged at a position almost symmetrical to each other in the opposing direction of the first and second main faces L2a, L2b, the multilayer capacitor C2 can be mounted in conformity to mounting directions relating to the opposing direction of the first and second main faces L2*a*, L2*b*. Therefore, the multilayer capacitor C2 can be mounted easily.

Third Embodiment

Figure 5:
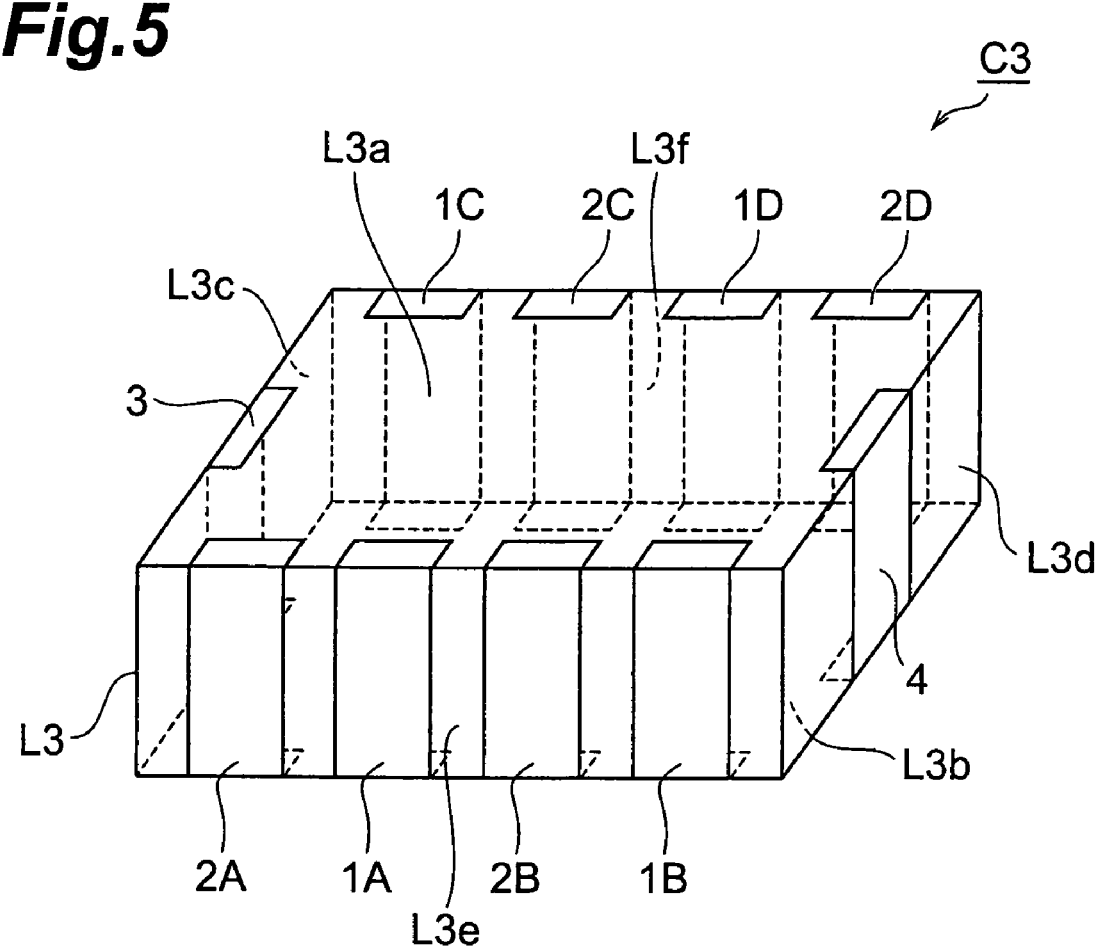
FIG. 5 is a perspective view of a multilayer capacitor in accordance with a third embodiment.
Figure 6:
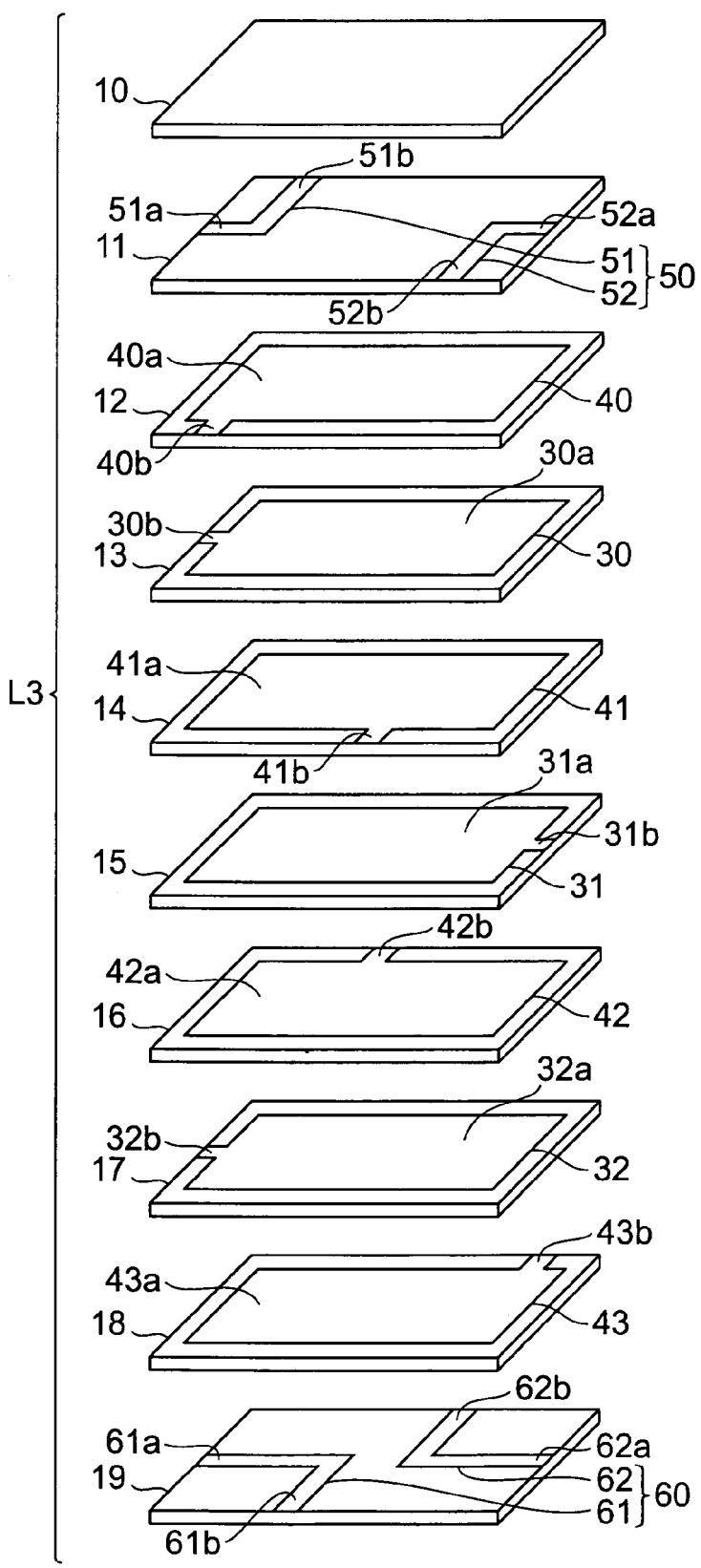
FIG. 6 is an exploded perspective view of the capacitor body included in the multilayer capacitor in accordance with the third embodiment.

With reference to FIGS. 5 and 6, the structure of a multilayer capacitor in accordance with a third embodiment will be explained. The multilayer capacitor C3 in accordance with the third embodiment differs from the multilayer capacitor C1 in accordance with the first embodiment in terms of how the first and second inner electrodes are connected to the first terminal electrodes. FIG. 5 is a perspective view of the multilayer capacitor in accordance with the third embodiment. FIG. 6 is an exploded perspective view of the capacitor body included in the multilayer capacitor in accordance with the third embodiment.

As shown in FIG. 5, the multilayer capacitor C3 comprises a capacitor body L3 shaped like a rectangular parallelepiped, and a plurality of (4 in this embodiment) first terminal electrodes 1A to 1D, a plurality of (4 in this embodiment) second terminal electrodes 2A to 2D, a first outer connecting conductor 3, and a second outer connecting conductor 4 which are arranged on the outer surface of the capacitor body L3. The capacitor body L3 includes oblong first and second main faces L3*a* and L3*b* opposing each other, first and second end faces L3*c* and L3*d* opposing each other, and first and second side faces L3*e* and L3*f* opposing each other. The first and second end faces L3*c*, L3*d* extend in the shorter side direction of the first and second main faces L3*a*, L3*b* so as to connect the first and second main faces L3*a*, L3*b* to each other. The first and second side faces L3*e*, L3*f* extend in the longer side direction of the first and second main faces L3*a*, L3*b* so as to connect the first and second main faces L3*a*, L3*b* to each other.

On the first side face L3*e* of the capacitor body L3, the first terminal electrodes 1A, 1B and second terminal electrodes 2A, 2B are arranged in the order of the second terminal electrode 2A, first terminal electrode 1A, second terminal electrode 2B, and first terminal electrode 1B from the first end face L3*c* side to the second end face L3*d* side. On the second side face L3*f* of the capacitor body L3, the first terminal electrodes 1C, 1D and second terminal electrodes 2C, 2D are arranged in the order of the first terminal electrode 1C, second terminal electrode 2C, first terminal electrode 1D, and second terminal electrode 2D from the first end face L3*c* side to the second end face L3*d* side.

The first outer connecting conductor 3 is arranged on the first end face L3*c* of the capacitor body L3. The second outer connecting conductor 4 is arranged on the second end face L3*d* of the capacitor body L3.

As shown in FIG. 6, the capacitor body L3 has a plurality of (10 in this embodiment) dielectric layers 10 to 19, a plurality of (3 in this embodiment) first inner electrodes 30 to 32, and a plurality of (4 in this embodiment) second inner electrodes 40 to 43. The capacitor body L3 further includes a plurality of (2 in this embodiment) inner connecting conductor layers 50, 60. The plurality of first and second inner electrodes 30 to 32, 40 to 43 are alternately arranged with the dielectric layers 12 to 17. The inner connecting conductor layers 50, 60 are arranged outside of the alternately arranged first and second inner electrodes 30 to 32, 40 to 43 in the opposing direction of the first and second main faces L3*a*, L3*b*. The first and second inner electrodes 30 to 32, 40 to 43 alternately arranged with the dielectric layers 12 to 17 are positioned between the inner connecting conductor layers 50 and 60.

In the capacitor body L3, the first and second inner electrodes 30 to 32, 40 to 43 are alternately arranged in the laminating direction of the dielectric layers 10 to 19, i.e., in the opposing direction of the first and second main faces L3*a*, L3*b*. The first and second inner electrodes 30 to 32, 40 to 43 are arranged such as to oppose each other with at least one of the dielectric layers 12 to 17 interposed in between.

The first inner electrodes 30 to 32 include main electrode portions 30*a* to 32*a*, lead electrode portions 30*b* to 32*b*, and lead electrode portions 30*c* to 32*c*. Each of the main electrode portions 30*a* to 32*a* has an oblong form whose longer side direction is the longer side direction of the first and second main faces L3*a*, L3*b*.

The lead electrode portions 30*b*, 32*b* of two first inner electrodes 30, 32 whose number (first number) is at least 1 but smaller than the total number of the first inner electrodes (3 in this embodiment) extend from the edges of the main electrode portions 30*a*, 32*a* on the first end face L3*c* side to the first end face L3*c*, so as to be drawn to the first end face L3*c*. The lead electrode portions 30*b*, 32*b* are connected to the first outer connecting conductor 3 electrically and physically.

The lead electrode portion 31*b* of one first inner electrode 31 whose number (second number) is smaller than the total number of the first inner electrodes (3 in this embodiment) by the first number, i.e., 2, extends from the edge of the main electrode portion 31*a* on the second end face L3*d* side to the second end face L3*d*, so as to be drawn to the second end face L3*d*. The lead electrode portion 31*b* is connected to the second outer connecting conductor 4 electrically and physically.

The second inner electrodes 40 to 43 include oblong main electrode portions 40*a* to 43*a* whose longer side direction is the longer side direction of the first and second main faces L3*a*, L3*b*, and lead electrode portions 40*b* to 43*b*.

The lead electrode portions 40*b*, 41*b* of the second inner electrodes 40, 41 extend from the edges on the first side face L3*e* side of their corresponding main electrode portions 40*a*, 41*a* to the first side face L3*e*, so as to be drawn to the first side face L3*e*. The lead electrode portions 40*b* and 41*b* are respectively connected to the second terminal electrodes 2A and 2B electrically and physically.

The lead electrode portions 42*b*, 43*b* of the second inner electrodes 42, 43 extend from the edges on the second side face L3*f* side of their corresponding main electrode portions 42*a*, 43*a* to the second side face L3*f*, so as to be drawn to the second side face L3*f*. The lead electrode portions 42*b* and 43*b* are respectively connected to the second terminal electrodes 2C and 2D electrically and physically.

Thus, the main electrode portions 40*a* to 43*a* of the second inner electrodes 40 to 43 are each connected to only one second terminal electrode in the plurality of terminal electrodes 2A to 2D through the lead electrode portions 40*b* to 43*b*.

The main electrode portions 30*a* to 32*a* of the first inner electrodes 30 to 32 and the main electrode portions 40*a* to 43*a* of the second inner electrodes 40 to 43 oppose each other with the dielectric layers 12 to 17 in between, and cooperate with each other, so as to form a predetermined capacitance component.

The inner connecting conductor layers 50, 60 have first inner connecting conductors 51, 61 and second inner connecting conductors 52, 62. In the inner connecting conductor layer 50, the first and second inner connecting conductors 51, 52 are oriented in such a way as to be along the opposing direction of the first and second end faces L3*c*, L3*d*. In the inner connecting conductor layer 60, the first and second inner connecting conductors 61, 62 are oriented in such a way as to be along the opposing direction of the first and second end faces L3c, L3d. Specifically, the first inner connecting conductors 51, 61 are positioned on the first end face L3c side, whereas the second inner connecting conductors 52, 62 are positioned on the second end face L3d side.

The first inner connecting conductors 51, 61 include first conductor portions 51a, 61a and second conductor portions 51b, 61b. Each of the first conductor portions 51a, 61a has an oblong form whose longer side direction is the longer side direction of the first and second main faces L3a, L3b. The longer sides of the first conductor portions 51a, 61a extend from positions corresponding to the first terminal electrode 1C to the first end face L3c in the direction along the longer sides of the first conductor portions 51a, 61a when seen in the opposing direction of the first and second main faces L3a, L3b. The first conductor portions 51a, 61a are drawn to the first end face L3c. The first conductor portions 51a, 61a are connected to the first outer connecting conductor 3 electrically and physically.

The shorter sides of the first conductor portions 51a, 61a are located at positions corresponding to the first outer connecting conductor 3 in the direction along the shorter sides of the first conductor portions 51a, 61a when seen in the opposing direction of the first and second main faces L3a, L3b.

The second conductor portion 51b of the first inner connecting conductor 51 extends from the end portion on the second end face L3d side in the longer side and on the second side face L3f side of the first conductor portion 51a to the second side face L3f, so as to be drawn to the second side face L3f. The second conductor portion 51b is connected to the first terminal electrode 1C electrically and physically.

The second conductor portion 61b of the first inner connecting conductor 61 extends from the end portion on the second end face L3d side in the longer side and on the first side face L3e side of the first conductor portion 61a to the first side face L3e, so as to be drawn to the first side face L3e. The second conductor portion 61b is connected to the first terminal electrode 1A electrically and physically.

The second inner connecting conductors 52, 62 include fourth conductor portions 52a, 62a and fifth conductor portions 52b, 62b. Each of the fourth conductor portions 52a, 62a has an oblong form whose longer side direction is the longer side direction of the first and second main faces L3a, L3b. The longer sides of the fourth conductor portion 52a extend from positions corresponding to the first terminal electrode 1B to the second end face L3d when seen in the opposing direction of the first and second main faces L3a, L3b. The longer sides of the fourth conductor portion 62a extend from positions corresponding to the first terminal electrode 1D to the second end face L3d when seen in the opposing direction of the first and second main faces L3a, L3b. The fourth conductor portions 52a, 62a are drawn to the second end face L3d. The fourth conductor portions 52a, 62a are connected to the second outer connecting conductor 4 electrically and physically.

The shorter sides of the fourth conductor portions 52a, 62a are located at positions corresponding to the second outer connecting conductor 4 when seen in the opposing direction of the first and second main faces L3a, L3b.

The fifth conductor portion 52b of the second inner connecting conductor 52 extends from the end portion on the first end face L3c side in the longer side and on the first side face L3e side of the fourth conductor portion 52a to the first side face L3e, so as to be drawn to the first side face L3e. The fifth conductor portion 52b is connected to the first terminal electrode 1B electrically and physically.

The fifth conductor portion 62b of the second inner connecting conductor 62 extends from the end portion on the first end face L3c side in the longer side and on the second side face L3f side of the fourth conductor portion 62a to the second side face L3f, so as to be drawn to the second side face L3f. The fifth conductor portion 62b is connected to the first terminal electrode 1D electrically and physically.

The main electrode portions 30a, 32a of the first inner electrodes 30, 32 are electrically connected to the first terminal electrode 1C through the first outer connecting conductor 3 and first inner connecting conductor 51. The main electrode portions 30a, 32a of the first inner electrodes 30, 32 are also electrically connected to the first terminal electrode 1A through the first outer connecting conductor 3 and first inner connecting conductor 61. The main electrode portion 31a of the first inner electrode 31 is electrically connected to the first terminal electrode 1B through the second outer connecting conductor 4 and second inner connecting conductor 52. The main electrode portion 31a of the first inner electrode 31 is also electrically connected to the first terminal electrode 1D through the second outer connecting conductor 4 and second inner connecting conductor 62.

In the multilayer capacitor C3, the first inner electrodes 30 to 32 are not directly connected to the first terminal electrodes 1A to 1D. Instead, the first inner electrodes 30, 32 of the multilayer capacitor C3 are electrically connected to the first terminal electrode 1C through the first outer connecting conductor 3 and first inner connecting conductor 51, and to the first terminal electrode 1A through the first outer connecting conductor 3 and first inner connecting conductor 61. The first inner electrode 31 of the multilayer capacitor C3 is electrically connected to the first terminal electrode 1B through the second outer connecting conductor 4 and second inner connecting conductor 52, and to the first terminal electrode 1D through the second outer connecting conductor 4 and second inner connecting conductor 62. As a result, the multilayer capacitor C3 can increase the equivalent series resistance as compared with a conventional multilayer capacitor in which all the first inner electrodes are physically connected to the first terminal electrodes.

In particular, the second inner electrodes 40 to 43 are directly physically connected to the second terminal electrodes 2A to 2D in the multilayer capacitor C3. Therefore, the equivalent series resistance of the multilayer capacitor C3 can be increased to an appropriate level, i.e., to such an extent that it is not excessively large.

In the multilayer capacitor C3, the main electrode portions 40a to 43a of the second inner electrodes 40 to 43 are connected to the respective second terminal electrodes 2A to 2D by the respective lead electrode portions 40b to 43b. Therefore, the multilayer capacitor C3 can further increase the equivalent series resistance.

In the multilayer capacitor C3, the first and second terminal electrodes 1A, 1B, 2A, 2B are alternately arranged on the first side face L3e when seen in the opposing direction of the first and second main faces L3a, L3b. Further, in the multilayer capacitor C3, the first and second terminal electrodes 1C, 1D, 2C, 2D are alternately arranged on the second side face L3f when seen in the opposing direction of the first and second main faces L3a, L3b. In this case, terminal electrodes adjacent to each other can be connected to different polarities not only on the first side face L3e but also on the second side face L3f, whereby the equivalent series inductance can be made smaller.

The inner connecting conductor layers 50, 60 are respectively arranged at both sides of outside of the first and second inner electrodes 30 to 32, 40 to 43 in the opposing direction of the first and second main faces L3a, L3b. Since the inner connecting conductor layers 50, 60 are thus arranged at a position almost symmetrical to each other in the opposing direction of the first and second main faces L3a, L3b, the multilayer capacitor C3 can be mounted in conformity to mounting directions relating to the opposing direction of the first and second main faces L3a, L3b. Therefore, the multilayer capacitor C3 can be mounted easily.

Fourth Embodiment

Figure 7:
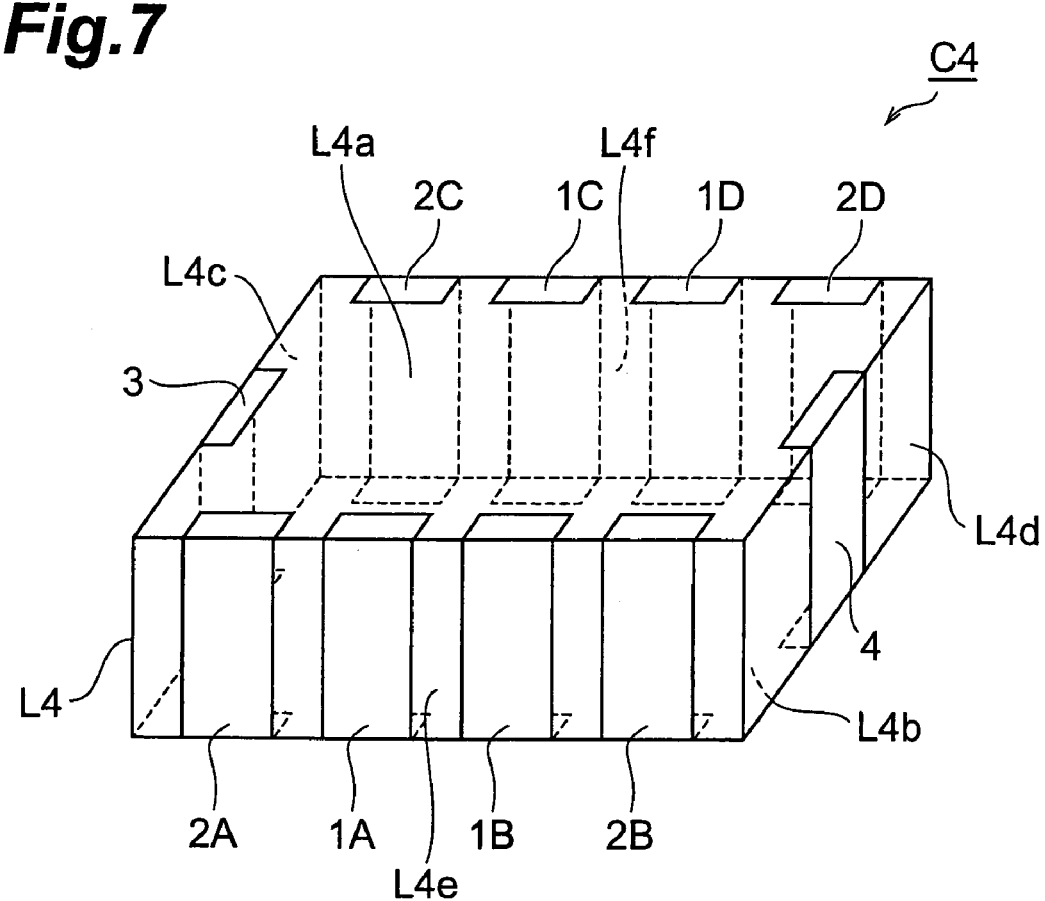
FIG. 7 is a perspective view of a multilayer capacitor in accordance with a fourth embodiment.
Figure 8:
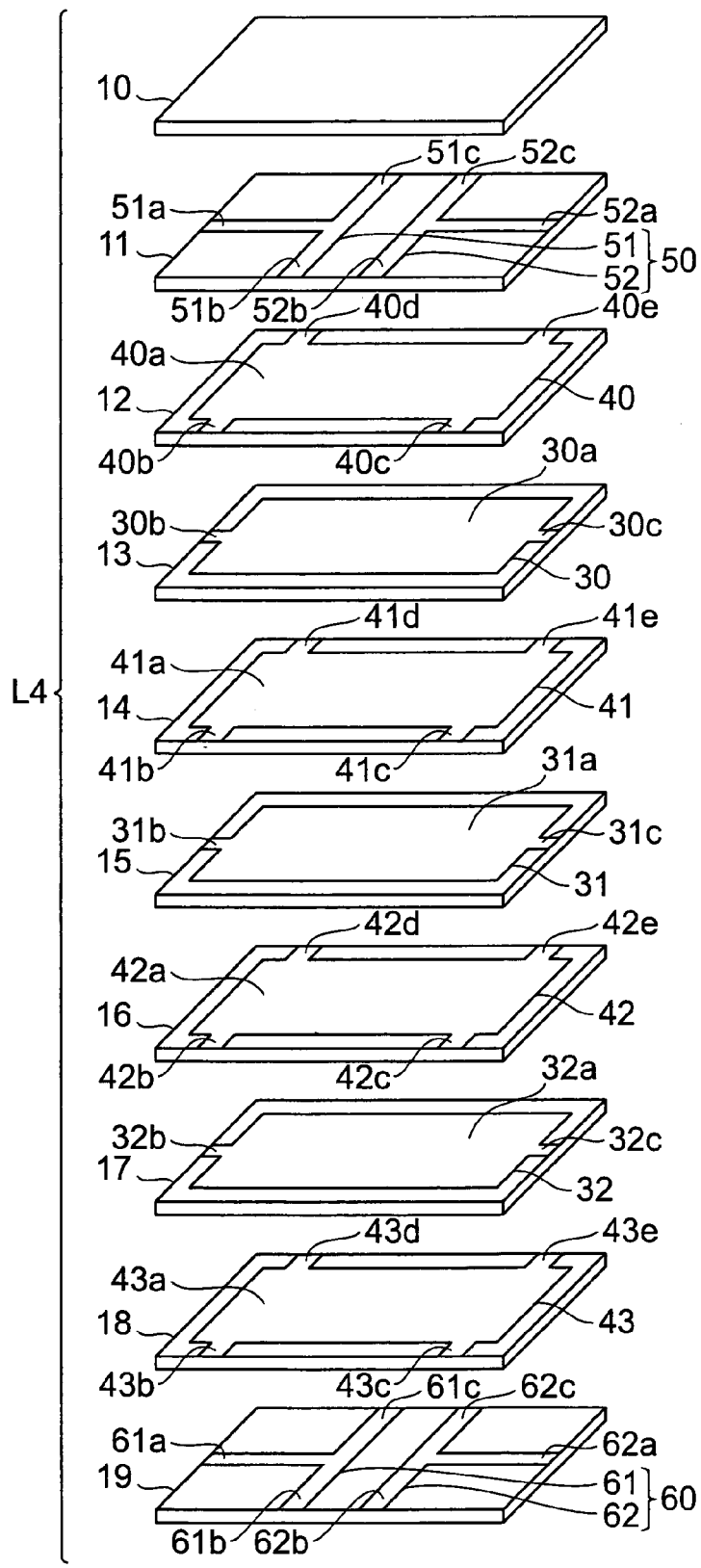
FIG. 8 is an exploded perspective view of the capacitor body included in the multilayer capacitor in accordance with the fourth embodiment.

With reference to FIGS. 7 and 8, the structure of a multilayer capacitor in accordance with a fourth embodiment will be explained. FIG. 7 is a perspective view of the multilayer capacitor in accordance with the fourth embodiment. FIG. 8 is an exploded perspective view of the capacitor body included in the multilayer capacitor in accordance with the fourth embodiment.

As shown in FIG. 7, the multilayer capacitor C4 in accordance with the fourth embodiment comprises a capacitor body L4 shaped like a rectangular parallelepiped, and a plurality of (4 in this embodiment) first terminal electrodes 1A to 1D, a plurality of (4 in this embodiment) second terminal electrodes 2A to 2D, a first outer connecting conductor 3, and a second outer connecting conductor 4 which are arranged on the outer surface of the capacitor body L4. The capacitor body L4 includes oblong first and second main faces L4a and L4b opposing each other, first and second end faces L4c and L4d opposing each other, and first and second side faces L4e and L4f opposing each other. The first and second end faces L4c, L4d extend in the shorter side direction of the first and second main faces L4a, L4b so as to connect the first and second main faces L4a, L4b to each other. The first and second side faces L4e, L4f extend in the longer side direction of the first and second main faces L4a, L4b so as to connect the first and second main faces L4a, L4b to each other.

On the first side face L4e of the capacitor body L4, the first terminal electrodes 1A, 1B and second terminal electrodes 2A, 2B are arranged in the order of the second terminal electrode 2A, first terminal electrode 1A, first terminal electrode 1B, and second terminal electrode 2B from the first end face L4c side to the second end face L4d side. Namely, the first and second terminal electrodes 1A, 2A are alternately arranged on the first side face L4e when seen in the opposing direction of the first and second main faces L4a, L4b. The first and second terminal electrodes 1B, 2B are alternately arranged on the first side face L4e when seen in the opposing direction of the first and second main faces L4a, L4b.

On the second side face L4f of the capacitor body L4, the first terminal electrodes 1C, 1D and second terminal electrodes 2C, 2D are arranged in the order of the second terminal electrode 2C, first terminal electrode 1C, first terminal electrode 1D, and second terminal electrode 2D from the first end face L4c side to the second end face L4d side. Namely, the first and second terminal electrodes 1C, 2C are alternately arranged on the second side face L4f when seen in the opposing direction of the first and second main faces L4a, L4b. The first and second terminal electrodes 1D, 2D are alternately arranged on the second side face L4f when seen in the opposing direction of the first and second main faces L4a, L4b.

The first outer connecting conductor 3 is arranged on the first end face L4c of the capacitor body L4. The second outer connecting conductor 4 is arranged on the second end face L4d of the capacitor body L4.

As shown in FIG. 8, the capacitor body L4 has a plurality of (10 in this embodiment) dielectric layers 10 to 19, a plurality of (3 in this embodiment) first inner electrodes 30 to 32, and a plurality of (4 in this embodiment) second inner electrodes 40 to 43. The capacitor body L4 further includes a plurality of (2 in this embodiment) inner connecting conductor layers 50, 60. The plurality of first and second inner electrodes 30 to 32, 40 to 43 are alternately arranged with the dielectric layers 12 to 17. The inner connecting conductor layers 50, 60 are arranged outside of the alternately arranged first and second inner electrodes 30 to 32, 40 to 43 in the opposing direction of the first and second main faces L4a, L4b. The first and second inner electrodes 30 to 32, 40 to 43 alternately arranged with the dielectric layers 12 to 17 are positioned between the inner connecting conductor layers 50 and 60.

In the capacitor body L4, the first and second inner electrodes 30 to 32, 40 to 43 are alternately arranged in the laminating direction of the dielectric layers 10 to 19, i.e., in the opposing direction of the first and second main faces L4a, L4b. The first and second inner electrodes 30 to 32, 40 to 43 are arranged such as to oppose each other with at least one of the dielectric layers 12 to 17 in between.

The first inner electrodes 30 to 32 include main electrode portions 30a to 32a, lead electrode portions 30b to 32b, and lead electrode portions 30c to 32c. Each of the main electrode portions 30a to 32a has an oblong form whose longer side direction is the longer side direction of the first and second main faces L4a, L4b.

The lead electrode portions 30b to 32b of the plurality of first inner electrodes 30 to 32 extend from the edges on the first end face L4c side of the main electrode portions 30a to 32a to the first end face L4c, so as to be connected to the first outer connecting conductor 3 electrically and physically. The lead electrode portions 30c to 32c of the plurality of first inner electrodes 30 to 32 extend from the edges on the second end face L4d side of the main electrode portions 30a to 32a to the second end face L4d, so as to be connected to the second outer connecting conductor 4 electrically and physically.

The second inner electrodes 40 to 43 include main electrode portions 40a to 43a and lead electrode portions 40b to 43b, 40c to 43c, 40d to 43d, 40e to 43e by the same number (4 in this embodiment) as that of the second terminal electrodes 2A to 2D. Each of the electrode portions 40a to 43a has an oblong form whose longer side direction is the longer side direction of the first and second main faces L4a, L4b.

The lead electrode portions 40b to 43b of the second inner electrodes 40 to 43 extend from the edges of the main electrode portions 40a to 43a on the first side face L4e side to the first side face L4e, so as to be connected to the second terminal electrode 2A electrically and physically. The lead electrode portions 40c to 43c of the second inner electrodes 40 to 43 extend from the edges of the main electrode portions 40a to 43a on the first side face L4e side to the first side face L4e, so as to be connected to the second terminal electrode 2B electrically and physically. The lead electrode portions 40d to 43d of the second inner electrodes 40 to 43 extend from the edges of the main electrode portions 40a to 43a on the second side face L4f side to the second side face L4f, so as to be connected to the second terminal electrode 2C electrically and physically. The lead electrode portions 40*e* to 43*e* of the second inner electrodes 40 to 43 extend from the edges of the main electrode portions 40*a* to 43*a* on the second side face L4*f* side to the second side face L4*f*, so as to be connected to the second terminal electrode 2D electrically and physically.

Thus, each of the main electrode portions 40*a* to 43*a* of the second inner electrodes 40 to 43 is connected to the plurality of second terminal electrodes 2A to 2D through the plurality of lead electrode portions 40*b* to 43*b*, 40*c* to 43*c*, 40*d* to 43*d*, 40*e* to 43*e* thereof.

The main electrode portions 30*a* to 32*a* of the first inner electrodes 30 to 32 and the main electrode portions 40*a* to 43*a* of the second inner electrodes 40 to 43 oppose each other with the dielectric layers 12 to 17 in between, and cooperate with each other, so as to form a predetermined capacitance component.

The inner connecting conductor layers 50, 60 have first inner connecting conductors 51, 61 and second inner connecting conductors 52, 62. In the inner connecting conductor layer 50, the first and second inner connecting conductors 51, 52 are oriented in such a way as to be along the opposing direction of the first and second end faces L4*c*, L4*d*. In the inner connecting conductor layer 60, the first and second inner connecting conductors 61, 62 are oriented in such a way as to be along the opposing direction of the first and second end faces L4*c*, L4*d*. Specifically, the first inner connecting conductors 51, 61 are positioned on the first end face L4*c* side, whereas the second inner connecting conductors 52, 62 are positioned on the second end face L4*d* side.

The first inner connecting conductors 51, 61 include first conductor portions 51*a*, 61*a*, second conductor portions 51*b*, 61*b*, and third conductor portions 51*c*, 61*c*. Each of the first conductor portions 51*a*, 61*a* has an oblong form whose longer side direction is the longer side direction of the first and second main faces L4*a*, L4*b*. The longer sides of the first conductor portions 51*a*, 61*a* extend from positions corresponding to the first terminal electrodes 1A, 1C to the first end face L4*c* when seen in the opposing direction of the first and second main faces L4*a*, L4*b*. The first conductor portions 51*a*, 61*a* are drawn to the first end face L4*c*. The first conductor portions 51*a*, 61*a* are connected to the first outer connecting conductor 3 electrically and physically.

The shorter sides of the first conductor portions 51*a*, 61*a* are located at positions corresponding to the first outer connecting conductor 3 when seen in the opposing direction of the first and second main faces L4*a*, L4*b*.

The second conductor portions 51*b*, 61*b* of the first inner connecting conductors 51, 61 extend from the end portions on the second end face L4*d* side in the longer sides and on the first side face L4*e* side of the first conductor portions 51*a*, 61*a* to the first side face L4*e*, so as to be drawn to the first side face L4*e*. The second conductor portions 51*b*, 61*b* are connected to the first terminal electrode 1A electrically and physically.

The third conductor portions 51*c*, 61*c* of the first inner connecting conductors 51, 61 extend from the end portions on the second end face L4*d* side in the longer sides and on the second side face L4*f* side of the first conductor portions 51*a*, 61*a* to the second side face L4*f*, so as to be drawn to the second side face L4*f*. The third conductor portions 51*c*, 61*c* are connected to the first terminal electrode 1C electrically and physically.

The lengths of the second conductor portion 51*b* and the third conductor portion 51*c* in the opposing direction of the first and second end faces L4*c*, L4*d* are same. The lengths of the second conductor portion 61*b* and the third conductor portion 61*c* in the opposing direction of the first and second end faces L4*c*, L4*d* are same. The lengths of the second conductor portion 51*b* and the third conductor portion 51*c* in the opposing direction of the first and second side faces L4*e*, L4*f* are same. The lengths of the second conductor portion 61*b* and the third conductor portion 61*c* in the opposing direction of the first and second side faces L4*e*, L4*f* are same.

The second inner connecting conductors 52, 62 include fourth conductor portions 52*a*, 62*a*, fifth conductor portions 52*b*, 62*b*, and sixth conductor portions 52*c*, 62*c*. Each of the fourth conductor portions 52*a*, 62*a* has an oblong form whose longer side direction is the longer side direction of the first and second main faces L4*a*, L4*b*. The longer sides of the fourth conductor portions 52*a*, 62*a* extend from positions corresponding to the first terminal electrodes 1B, 1D to the second end face L4*d* when seen in the opposing direction of the first and second main faces L4*a*, L4*b*. The fourth conductor portions 52*a*, 62*a* are drawn to the second end face L4*d*. The fourth conductor portions 52*a*, 62*a* are connected to the second outer connecting conductor 4 electrically and physically.

The shorter sides of the fourth conductor portions 52*a*, 62*a* are located at positions corresponding to the second outer connecting conductor 4 when seen in the opposing direction of the first and second main faces L4*a*, L4*b*.

The fifth conductor portions 52*b*, 62*b* of the second inner connecting conductors 52, 62 extend from the end portions on the first end face L4*c* side in the longer sides and on the first side face L4*e* side of the fourth conductor portions 52*a*, 62*a*, so as to be drawn to the first side face L4*e*. The fifth conductor portions 52*b*, 62*b* are connected to the first terminal electrode 1B electrically and physically.

The sixth conductor portions 52*c*, 62*c* of the second inner connecting conductors 52, 62 extend from the end portions on the first end face L4*c* side in the longer sides and on the second side face L4*f* side of the first conductor portions 52*a*, 62*a* to the second side face L4*f*, so as to be drawn to the second side face L4*f*. The sixth conductor portions 52*c*, 62*c* are connected to the first terminal electrode 1D electrically and physically.

The lengths of the fifth conductor portion 52*b* and the sixth conductor portion 52*c* in the opposing direction of the first and second end faces L4*c*, L4*d* are same. The lengths of the fifth conductor portion 62*b* and the sixth conductor portion 62*c* in the opposing direction of the first and second end faces L4*c*, L4*d* are same. The lengths of the fifth conductor portion 52*b* and the sixth conductor portion 52*c* in the opposing direction of the first and second side faces L4*e*, L4*f* are same. The lengths of the fifth conductor portion 62*b* and the sixth conductor portion 62*c* in the opposing direction of the first and second side faces L4*e*, L4*f* are same.

The main electrode portions 30*a* to 32*a* of the first inner electrodes 30 to 32 are electrically connected to the first terminal electrodes 1A, 1C through the first outer connecting conductor 3 and first inner connecting conductors 51, 61. The main electrode portions 30*a* to 32*a* of the first inner electrodes 30 to 32 are also electrically connected to the first terminal electrodes 1B, 1D through the second outer connecting conductor 4 and second inner connecting conductors 52, 62.

In the multilayer capacitor C4, the first inner electrodes 30 to 32 are not directly connected to the first terminal electrodes 1A to 1D. Instead, the first inner electrodes 30 to 32 of the multilayer capacitor C4 are electrically connected to the first terminal electrodes 1A, 1C through the first outer connecting conductor 3 and first inner connecting conductors 51, 61. The first inner electrodes 30 to 32 of the multilayer capacitor C4 are also electrically connected to the first terminal electrodes 1B, 1D through the second outer connecting conductor 4 and second inner connecting conductors 52, 62. As a result, the multilayer capacitor C4 can increase the equivalent series resistance as compared with a conventional multilayer capacitor in which all the first inner electrodes are physically connected to the first terminal electrodes.

In particular, the second inner electrodes 40 to 43 are directly physically connected to the second terminal electrodes 2A to 2D in the multilayer capacitor C4. Therefore, the equivalent series resistance of the multilayer capacitor C4 can be increased to an appropriate level, i.e., to such an extent that it is not excessively large.

Since the lengths in the opposing direction of the first and second end faces L4c, L4d and the lengths in the opposing direction of the first and second side faces L4e, L4f of the second conductor portions 51b, 61b are respectively equal to the corresponding lengths of the third conductor portion 51c, 61c, each of the ESR (equivalent series resistance) and ESL (equivalent series inductance) is consistent no matter what electrical path is used with respect to the first inner connecting conductors 51, 61. Since the lengths in the opposing direction of the first and second end faces L4c, L4d and the lengths in the opposing direction of the first and second side faces L4e, L4f of the fifth conductor portions 52b, 62b are respectively equal to the corresponding lengths of the sixth conductor portion 52c, 62c, each of the ESR and ESL is consistent no matter what electrical path is used with respect to the second inner connecting conductors 52, 62. This configuration enables to tightly control the equivalent series resistance value of the multilayer capacitor C4.

In the multilayer capacitor C4, each of the second inner electrodes 40 to 43 includes a plurality of (4 in this embodiment) lead electrode portions 40b to 43b, 40c to 43c, 40d to 43d, 40e to 43e. Therefore, the equivalent series resistance can be controlled correspondingly. This makes it possible to increase the equivalent series resistance of the multilayer capacitor C4 to an appropriate level, i.e., to such an extent that it is not excessively large.

In the multilayer capacitor C4, the first and second terminal electrodes 1A, 2A are alternately arranged on the first side face L4e when seen in the opposing direction of the first and second main faces L4a, L4b. In this case, terminal electrodes adjacent to each other can be connected to different polarities on the first side face L4e, whereby the equivalent series inductance can be made smaller.

Further, in the multilayer capacitor C4, the first and second terminal electrodes 1B, 2B are alternately arranged on the first side face L4e when seen in the opposing direction of the first and second main faces L4a, L4b. Therefore, the equivalent series inductance can be made further smaller.

Furthermore, in the multilayer capacitor C4, the first and second terminal electrodes 1C, 2C are alternately arranged on the second side face L4f when seen in the opposing direction of the first and second main faces L4a, L4b. Therefore, the equivalent series inductance can be made further smaller.

Moreover, in the multilayer capacitor C4, the first and second terminal electrodes 1D, 2D are alternately arranged on the second side face L4f when seen in the opposing direction of the first and second main faces L4a, L4b. Therefore, the equivalent series inductance can be made further smaller.

The inner connecting conductor layers 50, 60 are respectively arranged at both sides of outside of the first and second inner electrodes 30 to 32, 40 to 43 in the opposing direction of the first and second main faces L4a, L4b. Since the inner connecting conductor layers 50, 60 are thus arranged at a position almost symmetrical to each other in the opposing direction of the first and second main faces L4a, L4b, the multilayer capacitor C4 can be mounted in conformity to mounting directions relating to the opposing direction of the first and second main faces L4a, L4b. Therefore, the multilayer capacitor C4 can be mounted easily.

Fifth Embodiment

Figure 9:
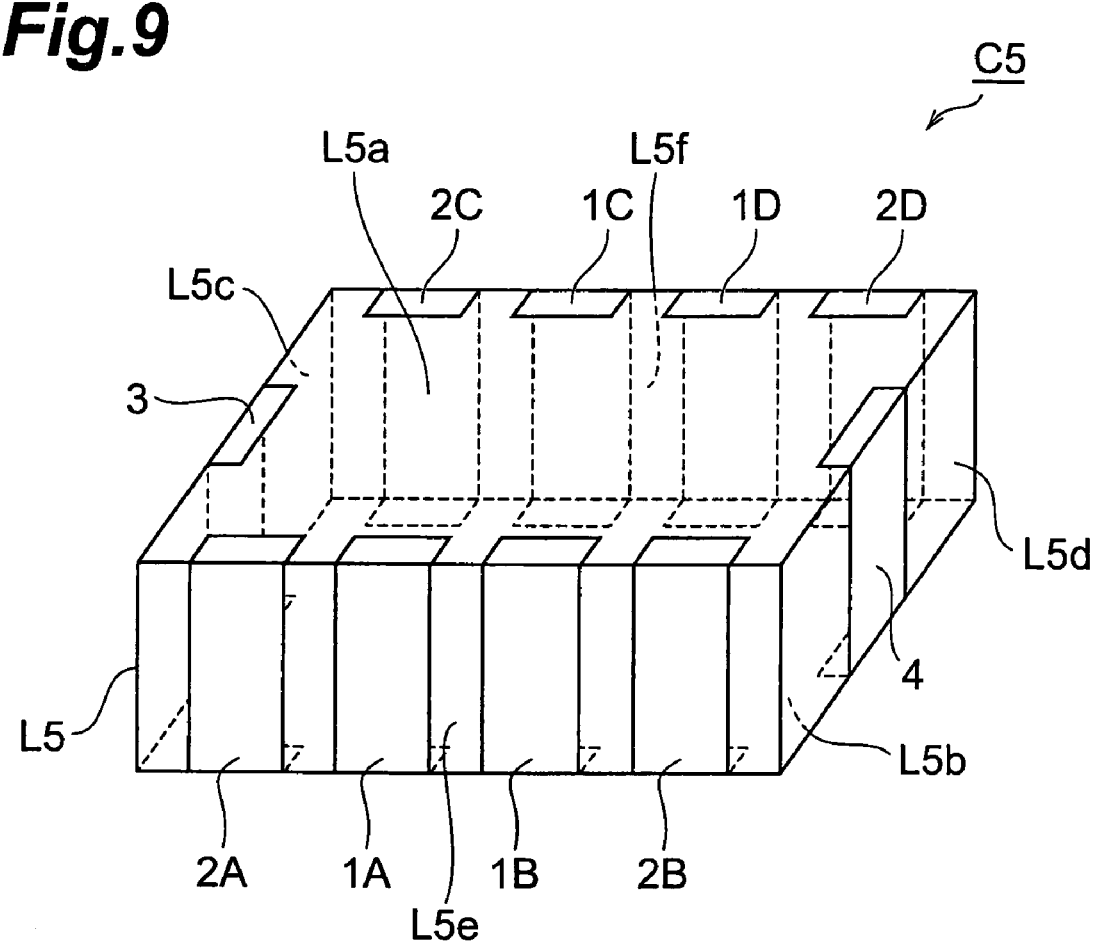
FIG. 9 is a perspective view of a multilayer capacitor in accordance with a fifth embodiment.
Figure 10:
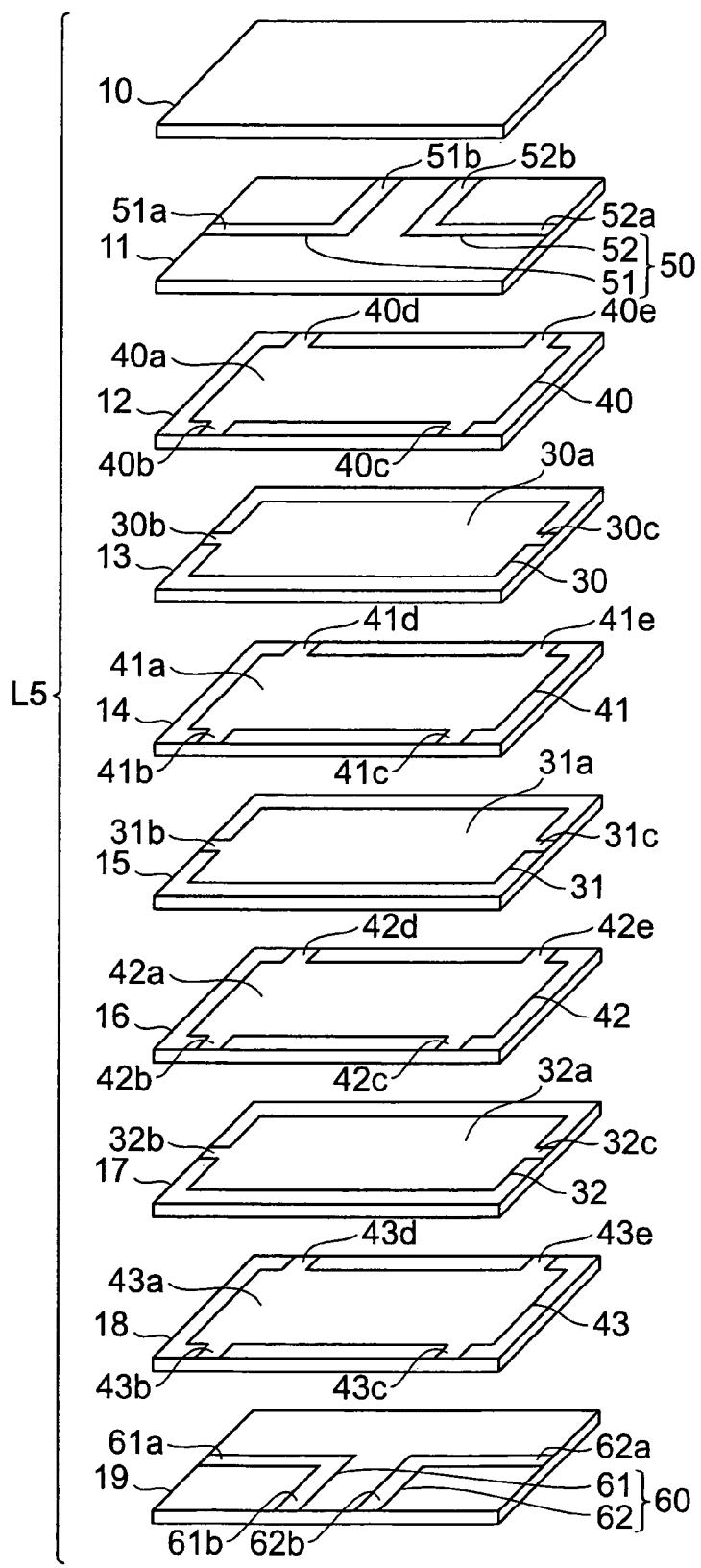
FIG. 10 is an exploded perspective view of the capacitor body included in the multilayer capacitor in accordance with the fifth embodiment.

With reference to FIGS. 9 and 10, the structure of a multilayer capacitor in accordance with a fifth embodiment will be explained. The multilayer capacitor C5 in accordance with the fifth embodiment differs from the multilayer capacitor C4 in accordance with the fourth embodiment in terms of how the first and second inner connecting conductors are connected to the first terminal electrodes. FIG. 9 is a perspective view of the multilayer capacitor in accordance with the fifth embodiment. FIG. 10 is an exploded perspective view of the capacitor body included in the multilayer capacitor in accordance with the fifth embodiment.

As shown in FIG. 9, the multilayer capacitor C5 in accordance with the fifth embodiment comprises a capacitor body L5 shaped like a rectangular parallelepiped, and a plurality of (4 in this embodiment) first terminal electrodes 1A to 1D, a plurality of (4 in this embodiment) second terminal electrodes 2A to 2D, a first outer connecting conductor 3, and a second outer connecting conductor 4 which are arranged on the outer surface of the capacitor body L5. As with the capacitor body L4, the capacitor body L5 includes oblong first and second main faces L5a and L5b opposing each other, first and second end faces L5c and L5d opposing each other, and first and second side faces L5e and L5f opposing each other.

On the first side face L5e of the capacitor body L5, the first terminal electrodes 1A, 1B and second terminal electrodes 2A, 2B are arranged in the order of the second terminal electrode 2A, first terminal electrode 1A, first terminal electrode 1B, and second terminal electrode 2B from the first end face L5c side to the second end face L5d side.

On the first side face L5f of the capacitor body L5, the first terminal electrodes 1C, 1D and second terminal electrodes 2C, 2D are arranged in the order of the second terminal electrode 2C, first terminal electrode 1C, first terminal electrode 1D, and second terminal electrode 2D from the first end face L5c side to the second end face L5d side.

The first outer connecting conductor 3 is arranged on the first end face L5c of the capacitor body L5. The second outer connecting conductor 4 is arranged on the second end face L5d of the capacitor body L5.

As shown in FIG. 10, the capacitor body L5 has a plurality of (10 in this embodiment) dielectric layers 10 to 19, a plurality of (3 in this embodiment) first inner electrodes 30 to 32, and a plurality of (4 in this embodiment) second inner electrodes 40 to 43. The capacitor body L5 further includes a plurality of (2 in this embodiment) inner connecting conductor layers 50, 60. The plurality of first and second inner electrodes 30 to 32, 40 to 43 are alternately arranged with the dielectric layers 12 to 17. The inner connecting conductor layers 50, 60 are arranged outside of the alternately arranged first and second inner electrodes 30 to 32, 40 to 43 in the opposing direction of the first and second main faces L5a, L5b. The first and second inner electrodes 30 to 32, 40 to 43 alternately arranged with the dielectric layers 12 to 17 are positioned between the inner connecting conductor layers 50 and 60.

In the capacitor body L5, the first and second inner electrodes 30 to 32, 40 to 43 are alternately arranged in the laminating direction of the dielectric layers 10 to 19, i.e., in the opposing direction of the first and second main faces L5a, L5b. The first and second inner electrodes 30 to 32, 40 to 43 are arranged such as to oppose each other with at least one of the dielectric layers 12 to 17 in between.

The first inner electrodes 30 to 32 include main electrode portions 30a to 32a, lead electrode portions 30b to 32b, and lead electrode portions 30c to 32c. Each of the main electrode portions 30a to 32a has an oblong form whose longer side direction is the longer side direction of the first and second main faces L5a, L5b.

The lead electrode portions 30b to 32b of the plurality of the first inner electrodes 30 to 32 extend from the edges on the first end face L5c side of the main electrode portions 30a to 32a to the first end face L5c, so as to be connected to the first outer connecting conductor 3 electrically and physically. The lead electrode portions 30c to 32c of the plurality of the first inner electrodes 30 to 32 extend from the edges on the second end face L5d side of the main electrode portions 30a to 32a to the second end face L5d, so as to be connected to the second outer connecting conductor 4 electrically and physically.

The second inner electrodes 40 to 43 include main electrode portions 40a to 43a and lead electrode portions 40b to 43b, 40c to 43c, 40d to 43d, 40e to 43e by the same number (4 in this embodiment) as that of the second terminal electrodes 2A to 2D. Each of the electrode portions 40a to 43a has an oblong form whose longer side direction is the longer side direction of the first and second main faces L5a, L5b.

The lead electrode portions 40b to 43b of the second inner electrodes 40 to 43 extend from the edges on the first side face L5e side of the main electrode portions 40a to 43a to the first side face L5e, so as to be connected to the second terminal electrode 2A electrically and physically. The lead electrode portions 40c to 43c of the second inner electrodes 40 to 43 extend from the edges on the first side face L5e side of the main electrode portions 40a to 43a to the first side face L5e, so as to be connected to the second terminal electrode 2B electrically and physically. The lead electrode portions 40d to 43d of the second inner electrodes 40 to 43 extend from the edges on the second side face L5f side of the main electrode portions 40a to 43a to the second side face L5f, so as to be connected to the second terminal electrode 2C electrically and physically. The lead electrode portions 40e to 43e of the second inner electrodes 40 to 43 extend from the edges on the second side face L5f side of the main electrode portions 40a to 43a to the second side face L5f, so as to be connected to the second terminal electrode 2D electrically and physically.

Thus, the main electrode portions 40a to 43a of the second inner electrodes 40 to 43 are connected to each of the plurality of second terminal electrodes 2A to 2D through the plurality of lead electrode portions 40b to 43b, 40c to 43c, 40d to 43d, 40e to 43e of the second inner electrodes 40 to 43.

The main electrode portions 30a to 32a of the first inner electrodes 30 to 32 and the main electrode portions 40a to 43a of the second inner electrodes 40 to 43 oppose each other with the dielectric layers 12 to 17 in between, and cooperate with each other, so as to form a predetermined capacitance component.

The inner connecting conductor layers 50, 60 have first inner connecting conductors 51, 61 and second inner connecting conductors 52, 62. In the inner connecting conductor layer 50, the first and second inner connecting conductors 51, 52 are oriented in such a way as to be along the opposing direction of the first and second end faces L5c, L5d. In the inner connecting conductor layer 60, the first and second inner connecting conductors 61, 62 are oriented in such a way as to be along the opposing direction of the first and second end faces L5c, L5d. Specifically, the first inner connecting conductors 51, 61 are positioned on the first end face L5c side, whereas the second inner connecting conductors 52, 62 are positioned on the second end face L5d side.

The first inner connecting conductors 51, 61 include first conductor portions 51a, 61a and second conductor portions 51b, 61b. Each of the first conductor portions 51a, 61a has an oblong form whose longer side direction is the longer side direction of the first and second main faces L5a, L5b. The longer sides of the first conductor portion 51a extend from positions corresponding to the first terminal electrode 1C to the first end face L5c when seen in the opposing direction of the first and second main faces L5a, L5b. The longer sides of the first conductor portion 61a extend from positions corresponding to the first terminal electrode 1A to the first end face L5c when seen in the opposing direction of the first and second main faces L5a, L5b. The first conductor portions 51a, 61a are drawn to the first end face L5c. The first conductor portions 51a, 61a are connected to the first outer connecting conductor 3 electrically and physically.

The shorter sides of the first conductor portions 51a, 61a are located at positions corresponding to the first outer connecting conductor 3 when seen in the opposing direction of the first and second main faces L5a, L5b.

The second conductor portion 51b of the first inner connecting conductor 51 extends from the end portion on the second end face L5d side in the longer side and on the second side face L5f side of the first conductor portion 51a to the second side face L5f, so as to be drawn to the second side face L5f. The second conductor portion 51b is connected to the first terminal electrode 1C electrically and physically.

The second conductor portion 61b of the first inner connecting conductor 61 extends from the end portion on the second end face L5d side in the longer side and on the first side face L5e side of the first conductor portion 61a to the first side face L5e, so as to be drawn to the first side face L5e. The second conductor portion 61b is connected to the first terminal electrode 1A electrically and physically.

The second inner connecting conductors 52, 62 include fourth conductor portions 52a, 62a and fifth conductor portions 52b, 62b. Each of the fourth conductor portions 52a, 62a has an oblong form whose longer side direction is the longer side direction of the first and second main faces L5a, L5b. The longer sides of the fourth conductor portion 52a extend from positions corresponding to the first terminal electrode 1D to the second end face L5d when seen in the opposing direction of the first and second main faces L5a, L5b. The longer sides of the fourth conductor portion 62a extend from positions corresponding to the first terminal electrode 1B to the second end face L5d when seen in the opposing direction of the first and second main faces L5a, L5b. The fourth conductor portions 52a, 62a are drawn to the second end face L5d. The fourth conductor portions 52a, 62a are connected to the second outer connecting conductor 4 electrically and physically.

The shorter sides of the fourth conductor portions 52a, 62a are located at positions corresponding to the second outer connecting conductor 4 when seen in the opposing direction of the first and second main faces L5a, L5b.

The fifth conductor portion 52b of the second inner connecting conductor 52 extends from the end portion on the first end face L5c side in the longer side and on the second side face L5f side of the fourth conductor portion 52a to the second side face L5f, so as to be drawn to the second side face L5f. The fifth conductor portion 52b is connected to the first terminal electrode 1D electrically and physically.

The fifth conductor portion 62b of the second inner connecting conductor 62 extends from the end portion on the first end face L5c side in the longer side and on the first side face L5e side of the fourth conductor portion 62a to the first side face L5e, so as to be drawn to the first side face L5e. The fifth conductor portion 62b is connected to the first terminal electrode 1B electrically and physically.

The main electrode portions 30a to 32a of the first inner electrodes 30 to 32 are electrically connected to the first terminal electrode 1C through the first outer connecting conductor 3 and first inner connecting conductor 51, and to the first terminal electrode 1A through the first outer connecting conductor 3 and first inner connecting conductor 61. The main electrode portions 30a to 32a of the first inner electrodes 30 to 32 are also electrically connected to the first terminal electrode 1D through the second outer connecting conductor 4 and second inner connecting conductor 52, and to the first terminal electrode 1B through the second outer connecting conductor 4 and second inner connecting conductor 62.

In the multilayer capacitor C5, the first inner electrodes 30 to 32 are not directly connected to the first terminal electrodes 1A to 1D. Instead, the first inner electrodes 30 to 32 of the multilayer capacitor C5 are electrically connected to the first terminal electrodes 1A, 1C through the first outer connecting conductor 3 and first inner connecting conductors 51, 61. The first inner electrodes 30 to 32 of the multilayer capacitor C5 are also electrically connected to the first terminal electrodes 1B, 1D through the second outer connecting conductor 4 and second inner connecting conductors 52, 62. As a result, the multilayer capacitor C5 can increase the equivalent series resistance as compared with a conventional multilayer capacitor in which all the first inner electrodes are physically connected to the first terminal electrodes.

In particular, the second inner electrodes 40 to 43 are directly physically connected to the second terminal electrodes 2A to 2D in the multilayer capacitor C5. Therefore, the equivalent series resistance of the multilayer capacitor C5 can be increased to an appropriate level, i.e., to such an extent that it is not excessively large.

In the multilayer capacitor C5, each of the second inner electrodes 40 to 43 includes a plurality of (4 in this embodiment) lead electrode portions 40b to 43b, 40c to 43c, 40d to 43d, 40e to 43e. Therefore, the equivalent series resistance can be controlled correspondingly. This makes it possible to increase the equivalent series resistance of the multilayer capacitor C5 to an appropriate level, i.e., to such an extent that it is not excessively large.

The multilayer capacitor C5 includes an arrangement in which the first and second terminal electrodes 1A to 1D, 2A to 2D are alternately positioned on the first and second side faces L5e, L5f when seen in the opposing direction of the first and second main faces L5a, L5b. In this case, terminal electrodes adjacent to each other can be connected to different polarities on the first side face L5e, whereby the equivalent series inductance can be made smaller.

The inner connecting conductor layers 50, 60 are respectively arranged at both sides of outside of the first and second inner electrodes 30 to 32, 40 to 43 in the opposing direction of the first and second main faces L5a, L5b. Since the inner connecting conductor layers 50, 60 are thus arranged at a position almost symmetrical to each other in the opposing direction of the first and second main faces L5a, L5b, the multilayer capacitor C5 can be mounted in conformity to mounting directions relating to the opposing direction of the first and second main faces L5a, L5b. Therefore, the multilayer capacitor C5 can be mounted easily.

Sixth Embodiment

Figure 11:
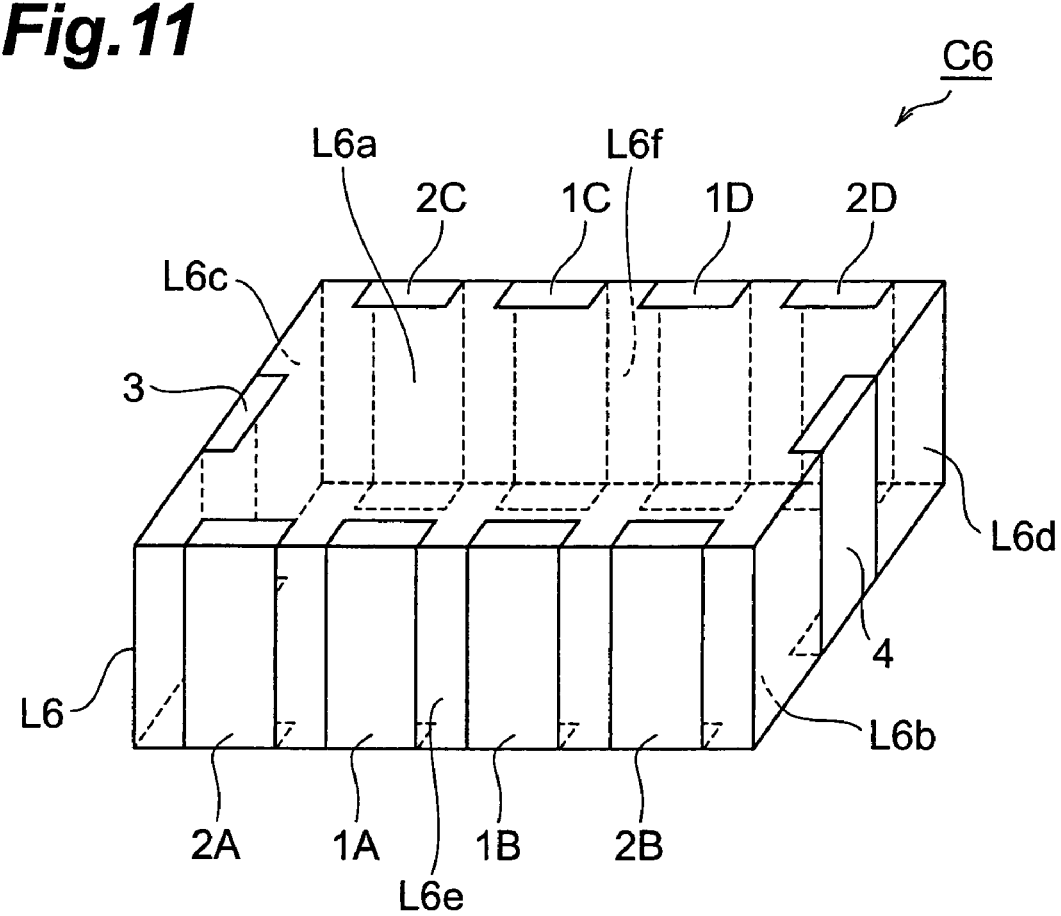
FIG. 11 is a perspective view of a multilayer capacitor in accordance with a sixth embodiment.
Figure 12:
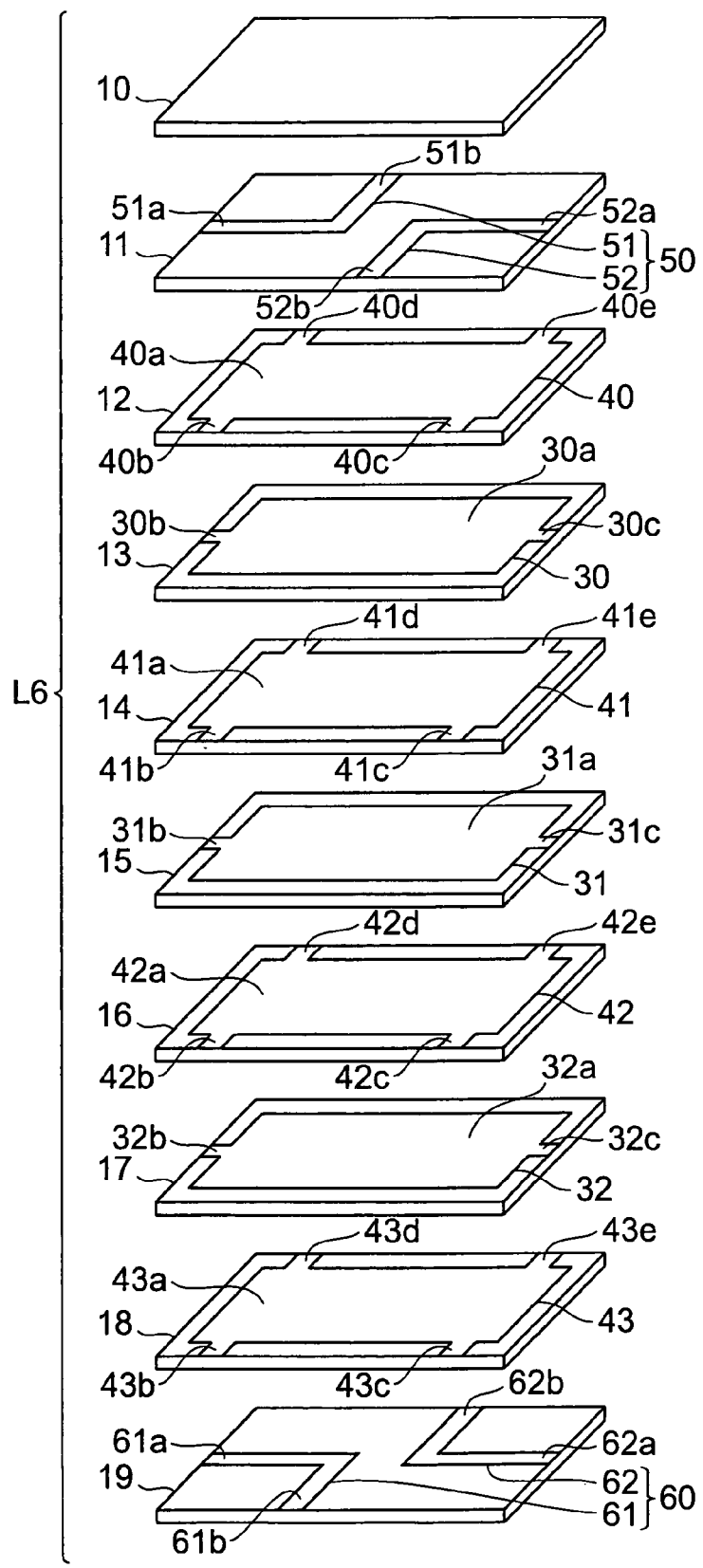
FIG. 12 is an exploded perspective view of the capacitor body included in the multilayer capacitor in accordance with the sixth embodiment.

With reference to FIGS. 11 and 12, the structure of a multilayer capacitor in accordance with a sixth embodiment will be explained. The multilayer capacitor C6 in accordance with the sixth embodiment differs from the multilayer capacitor C4 in accordance with the fourth embodiment in terms of how the first and second inner connecting conductors are connected to the first terminal electrodes. FIG. 11 is a perspective view of the multilayer capacitor in accordance with the sixth embodiment. FIG. 12 is an exploded perspective view of the capacitor body included in the multilayer capacitor in accordance with the sixth embodiment.

As shown in FIG. 11, the multilayer capacitor C6 in accordance with the sixth embodiment comprises a capacitor body L6 shaped like a rectangular parallelepiped, and a plurality of (4 in this embodiment) first terminal electrodes 1A to 1D, a plurality of (4 in this embodiment) second terminal electrodes 2A to 2D, a first outer connecting conductor 3, and a second outer connecting conductor 4 which are arranged on the outer surface of the capacitor body L6. As with the capacitor body L4, the capacitor body L6 includes oblong first and second main faces L6a and L6b opposing each other, first and second end faces L6c and L6d opposing each other, and first and second side faces L6e and L6f opposing each other.

On the first side face L6e of the capacitor body L6, the first terminal electrodes 1A, 1B and second terminal electrodes 2A, 2B are arranged in the order of the second terminal electrode 2A, first terminal electrode 1A, first terminal electrode 1B, and second terminal electrode 2B from the first end face L6c side to the second end face L6d side.

On the second side face L6f of the capacitor body L6, the first terminal electrodes 1C, 1D and second terminal electrodes 2C, 2D are arranged in the order of the second terminal electrode 2C, first terminal electrode 1C, first terminal electrode 1D, and second terminal electrode 2D from the first end face L6c side to the second end face L6d side.

The first outer connecting conductor 3 is arranged on the first end face L6c of the capacitor body L6. The second outer connecting conductor 4 is arranged on the second end face L6d of the capacitor body L6.

As shown in FIG. 12, the capacitor body L6 has a plurality of (10 in this embodiment) dielectric layers 10 to 19, a plurality of (3 in this embodiment) first inner electrodes 30 to 32, and a plurality of (4 in this embodiment) second inner electrodes 40 to 43. The capacitor body L6 further includes a plurality of (2 in this embodiment) inner connecting conductor layers 50, 60. The plurality of first and second inner electrodes 30 to 32, 40 to 43 are alternately arranged with the dielectric layers 12 to 17. The inner connecting conductor layers 50, 60 are arranged outside of the alternately arranged first and second inner electrodes 30 to 32, 40 to 43 in the opposing direction of the first and second main faces L6a, L6b. The first and second inner electrodes 30 to 32, 40 to 43 alternately arranged with the dielectric layers 12 to 17 are positioned between the inner connecting conductor layers 50 and 60.

In the capacitor body L6, the first and second inner electrodes 30 to 32, 40 to 43 are alternately arranged in the laminating direction of the dielectric layers 10 to 19, i.e., in the opposing direction of the first and second main faces L6a, L6b. The first and second inner electrodes 30 to 32, 40 to 43 are arranged such as to oppose each other with at least one of the dielectric layers 12 to 17 in between.

The first inner electrodes 30 to 32 include main electrode portions 30a to 32a, lead electrode portions 30b to 32b, and lead electrode portions 30c to 32c. Each of the main electrode portions 30a to 32a has an oblong form whose longer side direction is the longer side direction of the first and second main faces L6a, L6b.

The lead electrode portions 30b to 32b of the plurality of the first inner electrodes 30 to 32 extend from the edges on the first end face L6c side of the main electrode portions 30a to 32a to the first end face L6c, so as to be connected to the first outer connecting conductor 3 electrically and physically. The lead electrode portions 30c to 32c of the plurality of the first inner electrodes 30 to 32 extend from the edges on the second end face L6d side of the main electrode portions 30a to 32a to the second end face L6d, so as to be connected to the second outer connecting conductor 4 electrically and physically.

The second inner electrodes 40 to 43 include main electrode portions 40a to 43a and lead electrode portions 40b to 43b, 40c to 43c, 40d to 43d, 40e to 43e by the same number (4 in this embodiment) as that of the second terminal electrodes 2A to 2D. Each of the electrode portions 40a to 43a has an oblong form whose longer side direction is the longer side direction of the first and second main faces L6a, L6b.

The lead electrode portions 40b to 43b of the second inner electrodes 40 to 43 extend from the edges on the first side face L6e side of the main electrode portions 40a to 43a to the first side face L6e, so as to be connected to the second terminal electrode 2A electrically and physically. The lead electrode portions 40c to 43c of the second inner electrodes 40 to 43 extend from the edges on the first side face L6e side of the main electrode portions 40a to 43a to the first side face L6e, so as to be connected to the second terminal electrode 2B electrically and physically. The lead electrode portions 40d to 43d of the second inner electrodes 40 to 43 extend from the edges on the second side face L6f side of the main electrode portions 40a to 43a to the second side face L6f, so as to be connected to the second terminal electrode 2C electrically and physically. The lead electrode portions 40e to 43e of the second inner electrodes 40 to 43 extend from the edges on the second side face L6f side of the main electrode portions 40a to 43a to the second side face L6f, so as to be connected to the second terminal electrode 2D electrically and physically.

Thus, the main electrode portions 40a to 43a of the second inner electrodes 40 to 43 are connected to each of the plurality of second terminal electrodes 2A to 2D through the plurality of lead electrode portions 40b to 43b, 40c to 43c, 40d to 43d, 40e to 43e of the second inner electrodes 40 to 43.

The main electrode portions 30a to 32a of the first inner electrodes 30 to 32 and the main electrode portions 40a to 43a of the second inner electrodes 40 to 43 oppose each other with the dielectric layers 12 to 17 in between, and cooperate with each other, so as to form a predetermined capacitance component.

The inner connecting conductor layers 50, 60 have first inner connecting conductors 51, 61 and second inner connecting conductors 52, 62. In the inner connecting conductor layer 50, the first and second inner connecting conductors 51, 52 are oriented in such a way as to be along the opposing direction of the first and second end faces L6c, L6d. In the inner connecting conductor layer 60, the first and second inner connecting conductors 61, 62 are oriented in such a way as to be along the opposing direction of the first and second end faces L6c, L6d. Specifically, the first inner connecting conductors 51, 61 are positioned on the first end face L6c side, whereas the second inner connecting conductors 52, 62 are positioned on the second end face L6d side.

The first inner connecting conductors 51, 61 include first conductor portions 51a, 61a and second conductor portions 51b, 61b. Each of the first conductor portions 51a, 61a has an oblong form whose longer side direction is the longer side direction of the first and second main faces L6a, L6b. The longer sides of the first conductor portion 51a extend from positions corresponding to the first terminal electrode 1C to the first end face L6c when seen in the opposing direction of the first and second main faces L6a, L6b. The longer sides of the first conductor portion 61a extend from positions corresponding to the first terminal electrode 1A to the first end face L6c when seen in the opposing direction of the first and second main faces L6a, L6b. The first conductor portions 51a, 61a are drawn to the first end face L6c. The first conductor portions 51a, 61a are connected to the first outer connecting conductor 3 electrically and physically.

The shorter sides of the first conductor portions 51a, 61a are located at positions corresponding to the first outer connecting conductor 3 when seen in the opposing direction of the first and second main faces L6a, L6b.

The second conductor portion 51b of the first inner connecting conductor 51 extends from the end portion on the second end face L6d side in the longer side and on the second side face L6f side of the first conductor portion 51a to the second side face L6f, so as to be drawn to the second side face L6f. The second conductor portion 51b is connected to the first terminal electrode 1C electrically and physically.

The second conductor portion 61b of the first inner connecting conductor 61 extends from the end portion on the second end face L6d side in the longer side and on the first side face L6e side of the first conductor portion 61a to the second side face L6e, so as to be drawn to the first side face L6e. The second conductor portion 61b is connected to the first terminal electrode 1A electrically and physically.

The second inner connecting conductors 52, 62 include fourth conductor portions 52a, 62a and fifth conductor portions 52b, 62b. Each of the fourth conductor portions 52a, 62a has an oblong form whose longer side direction is the longer side direction of the first and second main faces L6a, L6b. The longer sides of the fourth conductor portion 52a extend from positions corresponding to the first terminal electrode 1B to the second end face L6d when seen in the opposing direction of the first and second main faces L6a, L6b. The longer sides of the fourth conductor portion 62a extend from positions corresponding to the first terminal electrode 1D to the second end face L6d when seen in the opposing direction of the first and second main faces L6a, L6b. The fourth conductor portions 52a, 62a are drawn to the second end face L6*d*. The fourth conductor portions 52*a*, 62*a* are connected to the second outer connecting conductor 4 electrically and physically.

The shorter sides of the fourth conductor portions 52*a*, 62*a* are located at positions corresponding to the second outer connecting conductor 4 when seen in the opposing direction of the first and second main faces L6*a*, L6*b*.

The fifth conductor portion 52*b* of the second inner connecting conductor 52 extends from the end portion on the first end face L6*c* side in the longer side and on the first side face L6*e* side of the fourth conductor portion 52*a* to the first side face L6*e*, so as to be drawn to the first side face L6*e*. The fifth conductor portion 52*b* is connected to the first terminal electrode 1B electrically and physically.

The fifth conductor portion 62*b* of the second inner connecting conductor 62 extends from the end portion on the first end face L6*c* side in the longer side and on the second side face L6*f* side of the fourth conductor portion 62*a* to the second side face L6*f*, so as to be drawn to the second side face L6*f*. The fifth conductor portion 62*b* is connected to the first terminal electrode 1D electrically and physically.

The main electrode portions 30*a* to 32*a* of the first inner electrodes 30 to 32 are electrically connected to the first terminal electrode 1C through the first outer connecting conductor 3 and first inner connecting conductor 51, and to the first terminal electrode 1A through the first outer connecting conductor 3 and first inner connecting conductor 61. The main electrode portions 30*a* to 32*a* of the first inner electrodes 30 to 32 are also electrically connected to the first terminal electrode 1B through the second outer connecting conductor 4 and second inner connecting conductor 52, and to the first terminal electrode 1D through the second outer connecting conductor 4 and second inner connecting conductor 62.

In the multilayer capacitor C6, the first inner electrodes 30 to 32 are not directly connected to the first terminal electrodes 1A to 1D. Instead, the first inner electrodes 30 to 32 of the multilayer capacitor C6 are electrically connected to the first terminal electrodes 1A, 1C through the first outer connecting conductor 3 and first inner connecting conductors 51, 61. The first inner electrodes 30 to 32 of the multilayer capacitor C6 are also electrically connected to the first terminal electrodes 1B, 1D through the second outer connecting conductor 4 and second inner connecting conductors 52, 62. As a result, the multilayer capacitor C6 can increase the equivalent series resistance as compared with a conventional multilayer capacitor in which all the first inner electrodes are physically connected to the first terminal electrodes.

In particular, the second inner electrodes 40 to 43 are directly physically connected to the second terminal electrodes 2A to 2D in the multilayer capacitor C6. Therefore, the equivalent series resistance of the multilayer capacitor C6 can be increased to an appropriate level, i.e., to such an extent that it is not excessively large.

In the multilayer capacitor C6, each of the second inner electrodes 40 to 43 includes a plurality of (4 in this embodiment) lead electrode portions 40*b* to 43*b*, 40*c* to 43*c*, 40*d* to 43*d*, 40*e* to 43*e*. Therefore, the equivalent series resistance can be controlled correspondingly. This makes it possible to increase the equivalent series resistance of the multilayer capacitor C6 to an appropriate level, i.e., to such an extent that it is not excessively large.

The multilayer capacitor C6 includes an arrangement in which the first and second terminal electrodes 1A to 1D, 2A to 2D are alternately positioned on the first and second side faces L6*e*, L6*f* when seen in the opposing direction of the first and second main faces L6*a*, L6*b*. In this case, terminal electrodes adjacent to each other can be connected to different polarities on the first side face L6*e*, whereby the equivalent series inductance can be made smaller.

The inner connecting conductor layers 50, 60 are respectively arranged at both sides of outside of the first and second inner electrodes 30 to 32, 40 to 43 in the opposing direction of the first and second main faces L6*a*, L6*b*. Since the inner connecting conductor layers 50, 60 are thus arranged at a position almost symmetrical to each other in the opposing direction of the first and second main faces L6*a*, L6*b*, the multilayer capacitor C6 can be mounted in conformity to mounting directions relating to the opposing direction of the first and second main faces L6*a*, L6*b*. Therefore, the multilayer capacitor C6 can be mounted easily.

Seventh Embodiment

Figure 13:
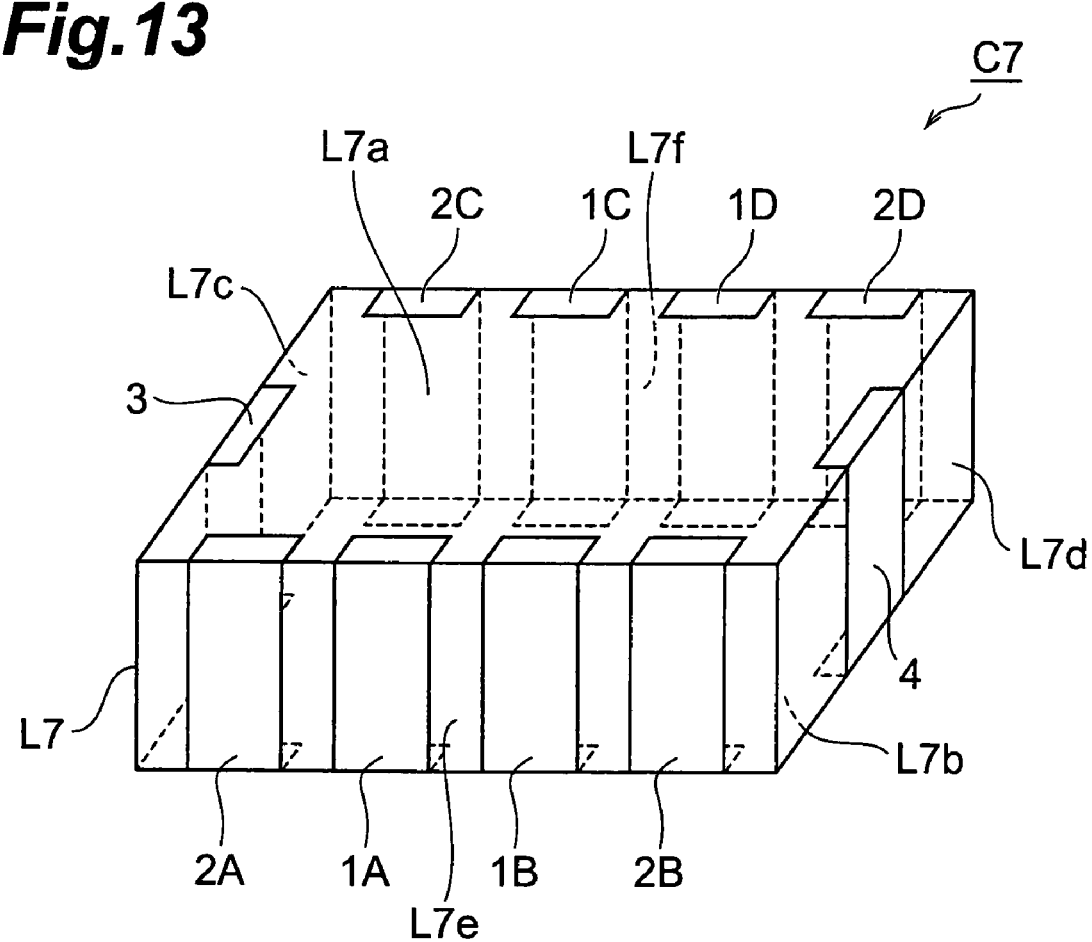
FIG. 13 is a perspective view of a multilayer capacitor in accordance with a seventh embodiment.
Figure 14:
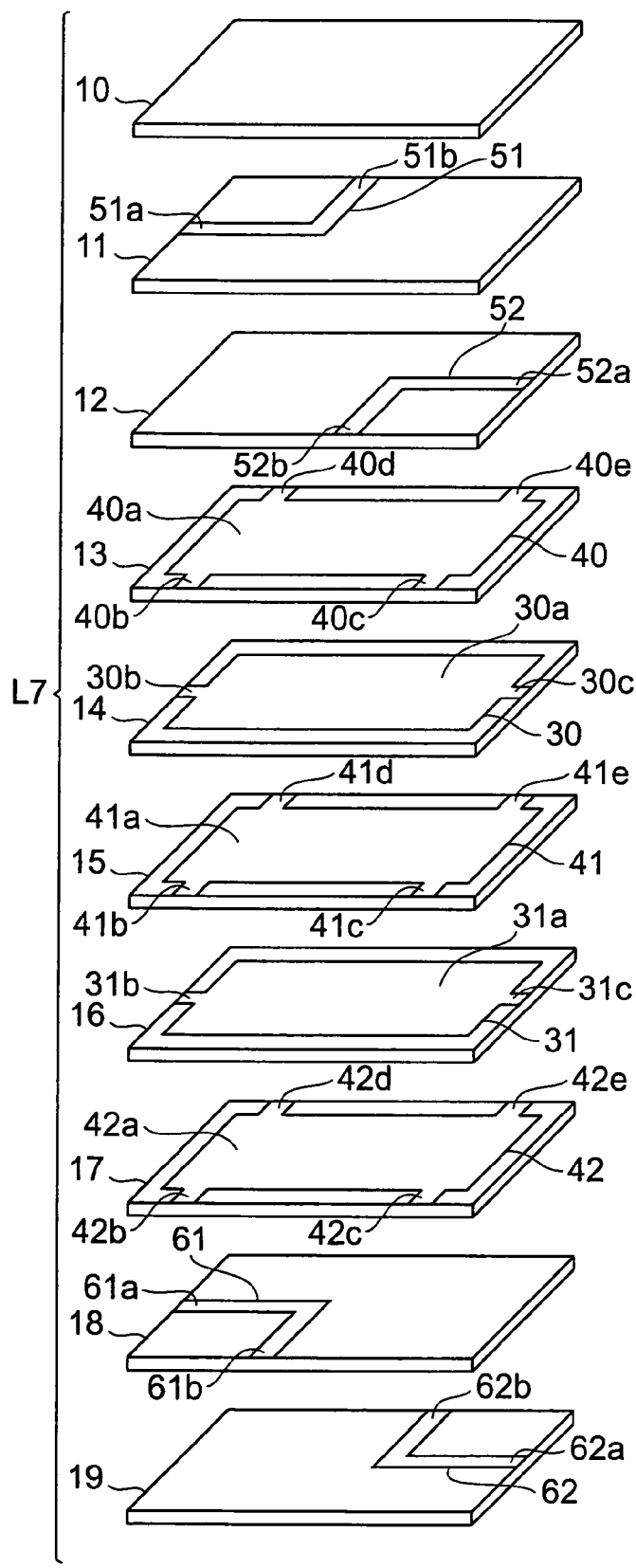
FIG. 14 is an exploded perspective view of the capacitor body included in the multilayer capacitor in accordance with the seventh embodiment.

With reference to FIGS. 13 and 14, the structure of a multilayer capacitor in accordance with a seventh embodiment will be explained. The multilayer capacitor C7 in accordance with the seventh embodiment differs from the multilayer capacitor C4 in accordance with the fourth embodiment in terms of how the first and second inner connecting conductors are connected to the first terminal electrodes. FIG. 13 is a perspective view of the multilayer capacitor in accordance with the seventh embodiment. FIG. 14 is an exploded perspective view of the capacitor body included in the multilayer capacitor in accordance with the seventh embodiment.

As shown in FIG. 13, the multilayer capacitor C7 in accordance with the seventh embodiment comprises a capacitor body L7 shaped like a rectangular parallelepiped, and a plurality of (4 in this embodiment) first terminal electrodes 1A to 1D, a plurality of (4 in this embodiment) second terminal electrodes 2A to 2D, a first outer connecting conductor 3, and a second outer connecting conductor 4 which are arranged on the outer surface of the capacitor body L7. As with the capacitor body L4, the capacitor body L7 includes oblong first and second main faces L7*a* and L7*b* opposing each other, first and second end faces L7*c* and L7*d* opposing each other, and first and second side faces L7*e* and L7*f* opposing each other.

On the first side face L7*e* of the capacitor body L7, the first terminal electrodes 1A, 1B and second terminal electrodes 2A, 2B are arranged in the order of the second terminal electrode 2A, first terminal electrode 1A, first terminal electrode 1B, and second terminal electrode 2B from the first end face L7*c* side to the second end face L7*d* side.

On the second side face L7*f* of the capacitor body L7, the first terminal electrodes 1C, 1D and second terminal electrodes 2C, 2D are arranged in the order of the second terminal electrode 2C, first terminal electrode 1C, first terminal electrode 1D, and second terminal electrode 2D from the first end face L7*c* side to the second end face L7*d* side.

The first outer connecting conductor 3 is arranged on the first end face L7*c* of the capacitor body L7. The second outer connecting conductor 4 is arranged on the second end face L7*d* of the capacitor body L7.

As shown in FIG. 14, the capacitor body L7 has a plurality of (10 in this embodiment) dielectric layers 10 to 19, a plurality of (2 in this embodiment) first inner electrodes 30, 31, and a plurality of (3 in this embodiment) second inner electrodes 40 to 42. The capacitor body L7 further includes a plurality of (2 each in this embodiment) first and second inner connecting conductors 51, 61, 52, 62. The plurality of first and second inner electrodes 30, 31, 40 to 42 are alternately arranged with the dielectric layers 13 to 16.

The first and second inner connecting conductors 51, 61, 52, 62 are arranged outside of the alternately arranged first and second inner electrodes 30, 31, 40 to 42 in the opposing direction of the first and second main faces L7a, L7b. The first and second inner electrodes 30, 31, 40 to 42 alternately arranged with the dielectric layers 13 to 16 are positioned between the second inner connecting conductor 52 and first inner connecting conductor 61. The second inner connecting conductor 52 is positioned between the first inner connecting conductor 51 and second inner electrode 40. The first inner connecting conductor 61 is positioned between the second inner connecting conductor 61 and second inner electrode 42.

In the capacitor body L7, the first inner electrodes 30, 31 and second inner electrodes 40 to 42 are alternately arranged in the laminating direction of the dielectric layers 10 to 19, i.e., in the opposing direction of the first and second main faces L7a, L7b. The first and second inner electrodes 30, 31, 40 to 42 are arranged such as to oppose each other with at least one of the dielectric layers 13 to 16 in between.

The first inner electrodes 30, 31 include main electrode portions 30a, 31a, lead electrode portions 30b, 31b, and lead electrode portions 30c, 31c. Each of the main electrode portions 30a, 31a has an oblong form whose longer side direction is the longer side direction of the first and second main faces L7a, L7b.

The lead electrode portions 30b, 31b of the plurality of the first inner electrodes 30, 31 extend from the edges on the first end face L7c side of the main electrode portions 30a, 31a to the first end face L7c, so as to be connected to the first outer connecting conductor 3 electrically and physically. The lead electrode portions 30c, 31c of the plurality of the first inner electrodes 30, 31 extend from the edges on the second end face L7d side of the main electrode portions 30a, 31a to the second end face L7d, so as to be connected to the second outer connecting conductor 4 electrically and physically.

The second inner electrodes 40 to 42 include main electrode portions 40 to 42a and lead electrode portions 40b to 42b, 40c to 42c, 40d to 42d, 40e to 42e by the same number (4 in this embodiment) as that of the second terminal electrodes 2A to 2D. Each of the electrode portions 40a to 42a has an oblong form whose longer side direction is the longer side direction of the first and second main faces L7a, L7b.

The lead electrode portions 40b to 42b of the second inner electrodes 40 to 42 extend from the edges on the first side face L7e side of the main electrode portions 40a to 42a to the first side face L7e, so as to be connected to the second terminal electrode 2A electrically and physically. The lead electrode portions 40c to 42c of the second inner electrodes 40 to 42 extend from the edges on the first side face L7e side of the main electrode portions 40a to 43a to the first side face L7e, so as to be connected to the second terminal electrode 2B electrically and physically. The lead electrode portions 40d to 42d of the second inner electrodes 40 to 42 extend from the edges on the second side face L7f side of the main electrode portions 40a to 42a to the second side face L7f, so as to be connected to the second terminal electrode 2C electrically and physically. The lead electrode portions 40e to 42e of the second inner electrodes 40 to 42 extend from the edges on the second side face L7f side of the main electrode portions 40a to 42a to the second side face L7f, so as to be connected to the second terminal electrode 2D electrically and physically.

Thus, the main electrode portions 40a to 42a of the second inner electrodes 40 to 42 are connected to each of the plurality of second terminal electrodes 2A to 2D through the plurality of lead electrode portions 40b to 42b, 40c to 42c, 40d to 42d, 40e to 42e of the second inner electrodes 40 to 42.

The main electrode portions 30a to 32a of the first inner electrodes 30 to 32 and the main electrode portions 40a to 43a of the second inner electrodes 40 to 43 oppose each other with the dielectric layers 13 to 16 in between, and cooperate with each other, so as to form a predetermined capacitance component.

The first inner connecting conductors 51, 61 include first conductor portions 51a, 61a and second conductor portions 51b, 61b. Each of the first conductor portions 51a, 61a has an oblong form whose longer side direction is the longer side direction of the first and second main faces L7a, L7b. The longer sides of the first conductor portion 51a extend from positions corresponding to the first terminal electrode 1C to the first end face L7c when seen in the opposing direction of the first and second main faces L7a, L7b. The longer sides of the first conductor portion 61a extend from positions corresponding to the first terminal electrode 1A to the first end face L7c when seen in the opposing direction of the first and second main faces L7a, L7b. The first conductor portions 51a, 61a are drawn to the first end face L7c. The first conductor portions 51a, 61a are connected to the first outer connecting conductor 3 electrically and physically.

The shorter sides of the first conductor portions 51a, 61a are located at positions corresponding to the first outer connecting conductor 3 when seen in the opposing direction of the first and second main faces L7a, L7b.

The second conductor portion 51b of the first inner connecting conductor 51 extends from the end portion on the second end face L7d side in the longer side and on the second side face L7f side of the first conductor portion 51a to the second side face L7f, so as to be drawn to the second side face L7f. The second conductor portion 51b is connected to the first terminal electrode 1C electrically and physically.

The second conductor portion 61b of the first inner connecting conductor 61 extends from the end portion on the second end face L7d side in the longer side and on the first side face L7e side of the first conductor portion 61a to the first side face L7e, so as to be drawn to the first side face L7e. The second conductor portion 61b is connected to the first terminal electrode 1A electrically and physically.

The second inner connecting conductors 52, 62 include fourth conductor portions 52a, 62a and fifth conductor portions 52b, 62b. Each of the fourth conductor portions 52a, 62a has an oblong form whose longer side direction is the longer side direction of the first and second main faces L7a, L7b. The longer sides of the fourth conductor portion 52a extend from positions corresponding to the first terminal electrode 1B to the second end face L7d when seen in the opposing direction of the first and second main faces L7a, L7b. The longer sides of the fourth conductor portion 62a extend from positions corresponding to the first terminal electrode 1D to the second end face L7d when seen in the opposing direction of the first and second main faces L7a, L7b. The fourth conductor portions 52a, 62a are drawn to the second end face L7d. The fourth conductor portions 52a, 62a are connected to the second outer connecting conductor 4 electrically and physically.

The shorter sides of the fourth conductor portions 52a, 62a are located at positions corresponding to the second outer connecting conductor 4 when seen in the opposing direction of the first and second main faces L7a, L7b.

The fifth conductor portion 52b of the second inner connecting conductor 52 extends from the end portion on the first end face L7c side in the longer side and on the first side face L7e side of the fourth conductor portion 52a to the first side face L7e, so as to be drawn to the first side face L7e. The fifth conductor portion 52b is connected to the first terminal electrode 1B electrically and physically.

The fifth conductor portion 62b of the second inner connecting conductor 62 extends from the end portion on the first end face L7c side in the longer side and on the second side face L7f side of the fourth conductor portion 62a to the second side face L7f, so as to be drawn to the second side face L7f. The fifth conductor portion 62b is connected to the first terminal electrode 1D electrically and physically.

The main electrode portions 30a, 31a of the first inner electrodes 30, 31 are electrically connected to the first terminal electrode 1C through the first outer connecting conductor 3 and first inner connecting conductor 51, and to the first terminal electrode 1A through the first outer connecting conductor 3 and first inner connecting conductor 61. The main electrode portions 30a, 31a of the first inner electrodes 30, 31 are also electrically connected to the first terminal electrode 1B through the second outer connecting conductor 4 and second inner connecting conductor 52, and to the first terminal electrode 1D through the second outer connecting conductor 4 and second inner connecting conductor 62.

In the multilayer capacitor C7, the first inner electrodes 30, 31 are not directly connected to the first terminal electrodes 1A to 1D. Instead, the first inner electrodes 30, 31 of the multilayer capacitor C7 are electrically connected to the first terminal electrodes 1A, 1C through the first outer connecting conductor 3 and first inner connecting conductors 51, 61. The first inner electrodes 30, 31 of the multilayer capacitor C7 are also electrically connected to the first terminal electrodes 1B, 1D through the second outer connecting conductor 4 and second inner connecting conductors 52, 62. As a result, the multilayer capacitor C7 can increase the equivalent series resistance as compared with a conventional multilayer capacitor in which all the first inner electrodes are physically connected to the first terminal electrodes.

In particular, the second inner electrodes 40 to 42 are directly physically connected to the second terminal electrodes 2A to 2D in the multilayer capacitor C7. Therefore, the equivalent series resistance of the multilayer capacitor C7 can be increased to an appropriate level, i.e., to such an extent that it is not excessively large.

In the multilayer capacitor C7, each of the second inner electrodes 40 to 42 includes a plurality of (4 in this embodiment) lead electrode portions 40b to 42b, 40c to 42c, 40d to 42d, 40e to 42e. Therefore, the equivalent series resistance can be controlled correspondingly. This makes it possible to increase the equivalent series resistance of the multilayer capacitor C7 to an appropriate level, i.e., to such an extent that it is not excessively large.

The multilayer capacitor C7 includes an arrangement in which the first and second terminal electrodes 1A to 1D, 2A to 2D are alternately positioned on the first and second side faces L7e, L7f when seen in the opposing direction of the first and second main faces L7a, L7b. In this case, terminal electrodes adjacent to each other can be connected to different polarities on the first side face L7e, whereby the equivalent series inductance can be made smaller.

The inner connecting conductors 51, 52 are arranged at one side of outside of the first and second inner electrodes 30 to 32, 40 to 43 in the opposing direction of the first and second main faces L7a, L7b whereas the inner connecting conductors 61, 62 are arranged at the other side of outside of the first and second inner electrodes 30 to 32, 40 to 43 in the above direction. Since a set of the inner connecting conductors 51, 52 and another set of the inner connecting conductors 61, 62 are thus arranged at a position almost symmetrical to each other in the opposing direction of the first and second main faces L7a, L7b, the multilayer capacitor C7 can be mounted in conformity to mounting directions relating to the opposing direction of the first and second main faces L7a, L7b. Therefore, the multilayer capacitor C7 can be mounted easily.

Eighth Embodiment

Figure 15:
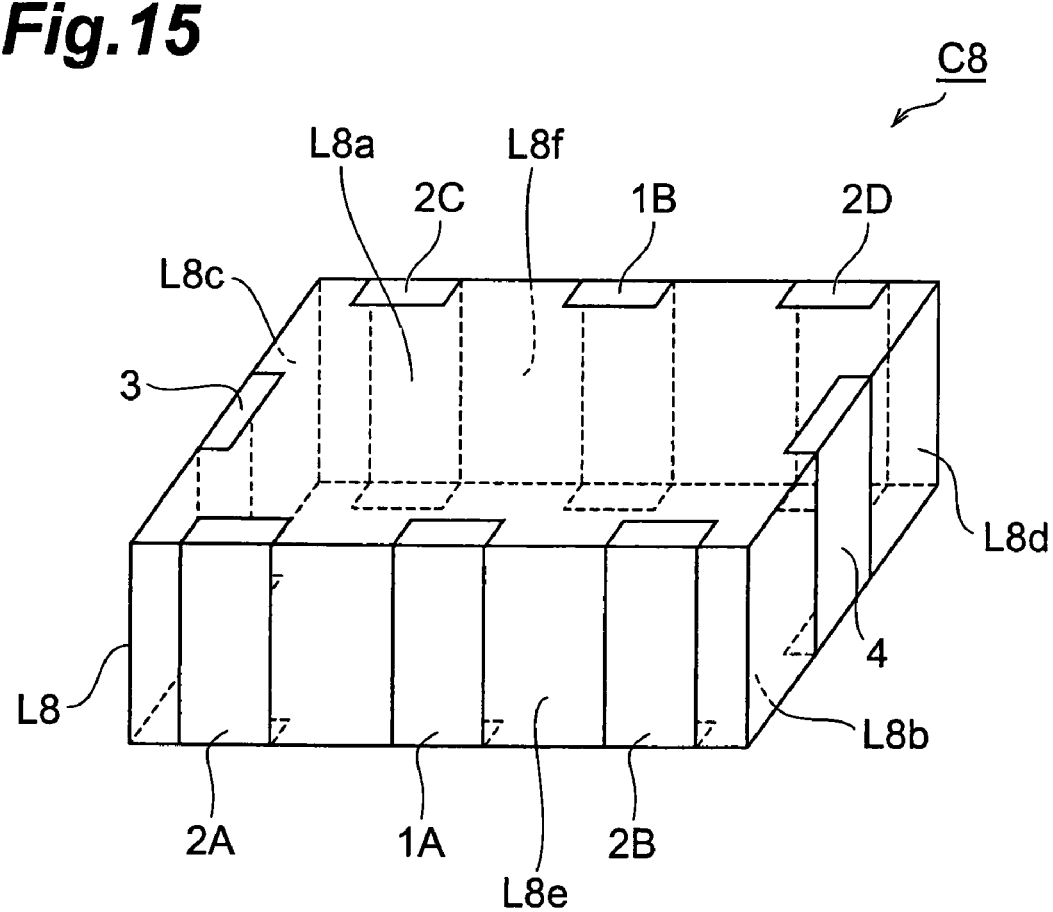
FIG. 15 is a perspective view of a multilayer capacitor in accordance with an eighth embodiment.
Figure 16:
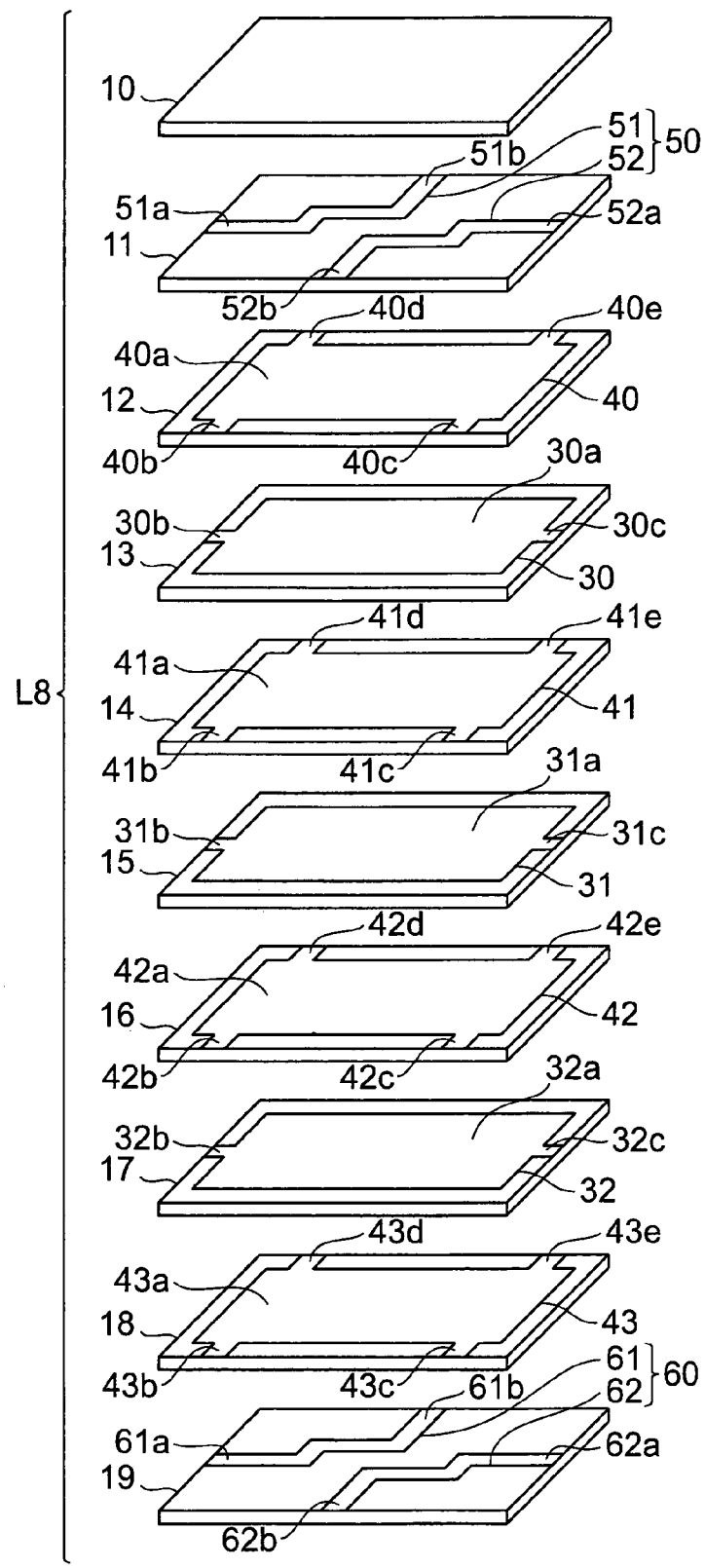
FIG. 16 is an exploded perspective view of the capacitor body included in the multilayer capacitor in accordance with the eighth embodiment.

With reference to FIGS. 15 and 16, the structure of a multilayer capacitor in accordance with an eighth embodiment will be explained. FIG. 15 is a perspective view of the multilayer capacitor in accordance with the eighth embodiment. FIG. 16 is an exploded perspective view of the capacitor body included in the multilayer capacitor in accordance with the eighth embodiment.

As shown in FIG. 15, the multilayer capacitor C8 in accordance with the seventh embodiment comprises a capacitor body L8 shaped like a rectangular parallelepiped, and a plurality of (2 in this embodiment) first terminal electrodes 1A, 1B, a plurality of (4 in this embodiment) second terminal electrodes 2A to 2D, a first outer connecting conductor 3, and a second outer connecting conductor 4 which are arranged on the outer surface of the capacitor body L8. The capacitor body L8 includes oblong first and second main faces L8a and L8b opposing each other, first and second end faces L8c and L8d opposing each other, and first and second side faces L8e and L8f opposing each other. The first and second end faces L8c, L8d extend in the shorter side direction of the first and second main faces L8a, L8b so as to connect the first and second main faces L8a, L8b to each other. The first and second side faces L8e, L8f extend in the longer side direction of the first and second main faces L8a, L8b so as to connect the first and second main faces L8a, L8b to each other.

On the first side face L8e of the capacitor body L8, the first terminal electrode 1A and second terminal electrodes 2A, 2B are arranged in the order of the second terminal electrode 2A, first terminal electrode 1A, and second terminal electrode 2B from the first end face L8c side to the second end face L8d side.

On the first side face L8f of the capacitor body L8, the first terminal electrode 1B and second terminal electrodes 2C, 2D are arranged in the order of the second terminal electrode 2C, first terminal electrode 1B, and second terminal electrode 2D from the first end face L8c side to the second end face L8d side.

The first outer connecting conductor 3 is arranged on the first end face L8c of the capacitor body L8. The second outer connecting conductor 4 is arranged on the second end face L8d of the capacitor body L8.

As shown in FIG. 16, the capacitor body L8 has a plurality of (10 in this embodiment) dielectric layers 10 to 19, a plurality of (3 in this embodiment) first inner electrodes 30 to 32, and a plurality of (4 in this embodiment) second inner electrodes 40 to 43. The capacitor body L8 further includes a plurality of (2 in this embodiment) inner connecting conductor layers 50, 60. The plurality of first and second inner electrodes 30 to 32, 40 to 43 are alternately arranged with the dielectric layers 12 to 17. The inner connecting conductor layers 50, 60 are arranged outside of the alternately arranged first and second inner electrodes 30 to 32, 40 to 43 in the opposing direction of the first and second main faces L8a, L8b. The first and second inner electrodes 30 to 32, 40 to 43 alternately arranged with the dielectric layers 12 to 17 are positioned between the inner connecting conductor layers 50 and 60.

In the capacitor body L8, the first and second inner electrodes 30 to 32, 40 to 43 are alternately arranged in the laminating direction of the dielectric layers 10 to 19, i.e., in the opposing direction of the first and second main faces L8a, L8b. The first and second inner electrodes 30 to 32, 40 to 43 are arranged such as to oppose each other with at least one of the dielectric layers 12 to 17 in between.

The first inner electrodes 30 to 32 include main electrode portions 30a to 32a, lead electrode portions 30b to 32b, and lead electrode portions 30c to 32c. Each of the main electrode portions 30a to 32a has an oblong form whose longer side direction is the longer side direction of the first and second main faces L8a, L8b.

The lead electrode portions 30b to 32b of the plurality of the first inner electrodes 30 to 32 extend from the edges on the first end face L8c side of the main electrode portions 30a to 32a to the first end face L8c, so as to be connected to the first outer connecting conductor 3 electrically and physically. The lead electrode portions 30c to 32c of the plurality of the first inner electrodes 30 to 32 extend from the edges on the second end face L8d side of the main electrode portions 30a to 32a to the second end face L8d, so as to be connected to the second outer connecting conductor 4 electrically and physically.

The second inner electrodes 40 to 43 include main electrode portions 40a to 43a and lead electrode portions 40b to 43b, 40c to 43c, 40d to 43d, 40e to 43e by the same number (4 in this embodiment) as that of the second terminal electrodes 2A to 2D. Each of the electrode portions 40a to 43a has an oblong form whose longer side direction is the longer side direction of the first and second main faces L8a, L8b.

The lead electrode portions 40b to 43b of the second inner electrodes 40 to 43 extend from the edges on the first side face L8e side of the main electrode portions 40a to 43a to the first side face L8e, so as to be connected to the second terminal electrode 2A electrically and physically. The lead electrode portions 40c to 43c of the second inner electrodes 40 to 43 extend from the edges on the first side face L8e side of the main electrode portions 40a to 43a to the first side face L8e, so as to be connected to the second terminal electrode 2B electrically and physically. The lead electrode portions 40d to 43d of the second inner electrodes 40 to 43 extend from the edges on the second side face L8f side of the main electrode portions 40a to 43a to the second side face L8f, so as to be connected to the second terminal electrode 2C electrically and physically. The lead electrode portions 40e to 43e of the second inner electrodes 40 to 43 extend from the edges on the second side face L8f side of the main electrode portions 40a to 43a to the second side face L8f, so as to be connected to the second terminal electrode 2D electrically and physically.

Thus, the main electrode portions 40a to 43a of the second inner electrodes 40 to 43 are connected to each of the plurality of second terminal electrodes 2A to 2D through the plurality of lead electrode portions 40b to 43b, 40c to 43c, 40d to 43d, 40e to 43e of the second inner electrodes 40 to 43.

The main electrode portions 30a to 32a of the first inner electrodes 30 to 32 and the main electrode portions 40a to 43a of the second inner electrodes 40 to 43 oppose each other with the dielectric layers 12 to 17 in between, and cooperate with each other, so as to form a predetermined capacitance component.

The inner connecting conductor layers 50, 60 have first inner connecting conductors 51, 61 and second inner connecting conductors 52, 62. In the inner connecting conductor layer 50, the first and second inner connecting conductors 51, 52 are oriented in such a way as to be along the opposing direction of the first and second end faces L8c, L8d. In the inner connecting conductor layer 60, the first and second inner connecting conductors 61, 62 are oriented in such a way as to be along the opposing direction of the first and second end faces L8c, L8d. Specifically, the first inner connecting conductors 51, 61 are positioned on the first end face L8c side, whereas the second inner connecting conductors 52, 62 are positioned on the second end face L8d side.

The first inner connecting conductors 51, 61 include first conductor portions 51a, 61a and second conductor portions 51b, 61b. Each of the first conductor portions 51a, 61a has an oblong form whose longer side direction is the longer side direction of the first and second main faces L8a, L8b. The longer sides of the first conductor portions 51a, 61a extend from positions closer to the first end face L8c than are positions corresponding to the first terminal electrode 1B to the first end face L8c when seen in the opposing direction of the first and second main faces L8a, L8b. The first conductor portions 51a, 61a are drawn to the first end face L8c. The first conductor portions 51a, 61a are connected to the first outer connecting conductor 3 electrically and physically.

The shorter sides of the first conductor portions 51a, 61a are located at positions corresponding to the first outer connecting conductor 3 when seen in the opposing direction of the first and second main faces L8a, L8b.

The second conductor portions 51b, 61b of the first inner connecting conductors 51, 61 extend from the end portions on the second end face L8d side in the longer sides and on the second side face L8f side of the first conductor portions 51a, 61a to the second side face L8f, so as to be drawn to the second side face L8f. Specifically, the second conductor portions 51b, 61b include first regions extending in the opposing direction of the first and second side faces L8e, L8f from the first conductor portions 51a, 61a toward the second side face L8f without reaching the second side face L8f, second regions extending from the first regions toward the second end face L8d, and third regions extending along the opposing direction of the first and second side faces L8e, L8f from the second regions to the second side face L8f. The second conductor portions 51b, 61b are connected to the first terminal electrode 1B electrically and physically.

The second inner connecting conductors 52, 62 include fourth conductor portions 52a, 62a and fifth conductor portions 52b, 62b. Each of the fourth conductor portions 52a, 62a has an oblong form whose longer side direction is the longer side direction of the first and second main faces L8a, L8b. The longer sides of the fourth conductor portions 52a, 62a extend from positions closer to the second end face L8d than are positions corresponding to the first terminal electrode 1A to the second end face L8d when seen in the opposing direction of the first and second main faces L8a, L8b. The fourth conductor portions 52a, 62a are drawn to the second end face L8*d*. The fourth conductor portions 52*a*, 62*a* are connected to the second outer connecting conductor 4 electrically and physically.

The shorter sides of the fourth conductor portions 52*a*, 62*a* are located at positions corresponding to the second outer connecting conductor 4 when seen in the opposing direction of the first and second main faces L8*a*, L8*b*.

The fifth conductor portions 52*b*, 62*b* of the second inner connecting conductors 52, 62 extend from the end portions on the first end face L8*c* side in the longer sides and on the first side face L8*e* side of the fourth conductor portions 52*a*, 62*a* to the first side face L8*e*, so as to be drawn to the first side face L8*e*. Specifically, the fifth conductor portions 52*b*, 62*b* include first regions extending in the opposing direction of the first and second side faces L8*e*, L8*f* from the fourth conductor portions 52*a*, 62*a* toward the first side face L8*e* without reaching the first side face L8*e*, second regions extending from the first regions toward the first end face L8*c*, and third regions extending along the opposing direction of the first and second side faces L8*e*, L8*f* from the second regions to the first side face L8*e*. The fifth conductor portions 52*b*, 62*b* are connected to the first terminal electrode 1A electrically and physically.

The main electrode portions 30*a* to 32*a* of the first inner electrodes 30 to 32 are electrically connected to the first terminal electrode 1B through the first outer connecting conductor 3 and first inner connecting conductors 51, 61. The main electrode portions 30*a* to 32*a* of the first inner electrodes 30 to 32 are also electrically connected to the first terminal electrode 1A through the second outer connecting conductor 4 and second inner connecting conductors 52, 62.

In the multilayer capacitor C8, the first inner electrodes 30 to 32 are not directly connected to the first terminal electrodes 1A, 1B. Instead, the first inner electrodes 30 to 32 of the multilayer capacitor C8 are electrically connected to the first terminal electrode 1B through the first outer connecting conductor 3 and first inner connecting conductors 51, 61. The first inner electrodes 30 to 32 of the multilayer capacitor C8 are also electrically connected to the first terminal electrode 1A through the second outer connecting conductor 4 and second inner connecting conductors 52, 62. As a result, the multilayer capacitor C8 can increase the equivalent series resistance as compared with a conventional multilayer capacitor in which all the first inner electrodes are physically connected to the first terminal electrodes.

In particular, the second inner electrodes 40 to 43 are directly physically connected to the second terminal electrodes 2A to 2D in the multilayer capacitor C8. Therefore, the equivalent series resistance of the multilayer capacitor C8 can be increased to an appropriate level, i.e., to such an extent that it is not excessively large.

In the multilayer capacitor C8, each of the second inner electrodes 40 to 43 includes a plurality of (4 in this embodiment) lead electrode portions 40*b* to 43*b*, 40*c* to 43*c*, 40*d* to 43*d*, 40*e* to 43*e*. Therefore, the equivalent series resistance can be controlled correspondingly. This makes it possible to increase the equivalent series resistance of the multilayer capacitor C8 to an appropriate level, i.e., to such an extent that it is not excessively large.

The multilayer capacitor C8 includes an arrangement in which the first and second terminal electrodes 1A, 1B, 2A to 2D are alternately positioned on the first and second side faces L8*e*, L8*f* when seen in the opposing direction of the first and second main faces L8*a*, L8*b*. In this case, terminal electrodes adjacent to each other can be connected to different polarities on the first side face L8*e*, whereby the equivalent series inductance can be made smaller.

The inner connecting conductor layers 50, 60 are respectively arranged at both sides of outside of the first and second inner electrodes 30 to 32, 40 to 43 in the opposing direction of the first and second main faces L8*a*, L8*b*. Since the inner connecting conductor layers 50, 60 are thus arranged at a position almost symmetrical to each other in the opposing direction of the first and second main faces L8*a*, L8*b*, the multilayer capacitor C8 can be mounted in conformity to mounting directions relating to the opposing direction of the first and second main faces L8*a*, L8*b*. Therefore, the multilayer capacitor C8 can be mounted easily.

Though preferred embodiments of the present invention are explained in the foregoing, the present invention is not necessarily limited to the above-mentioned embodiments but can be modified in various ways within the scope not deviating from the gist thereof.

Figure 17:
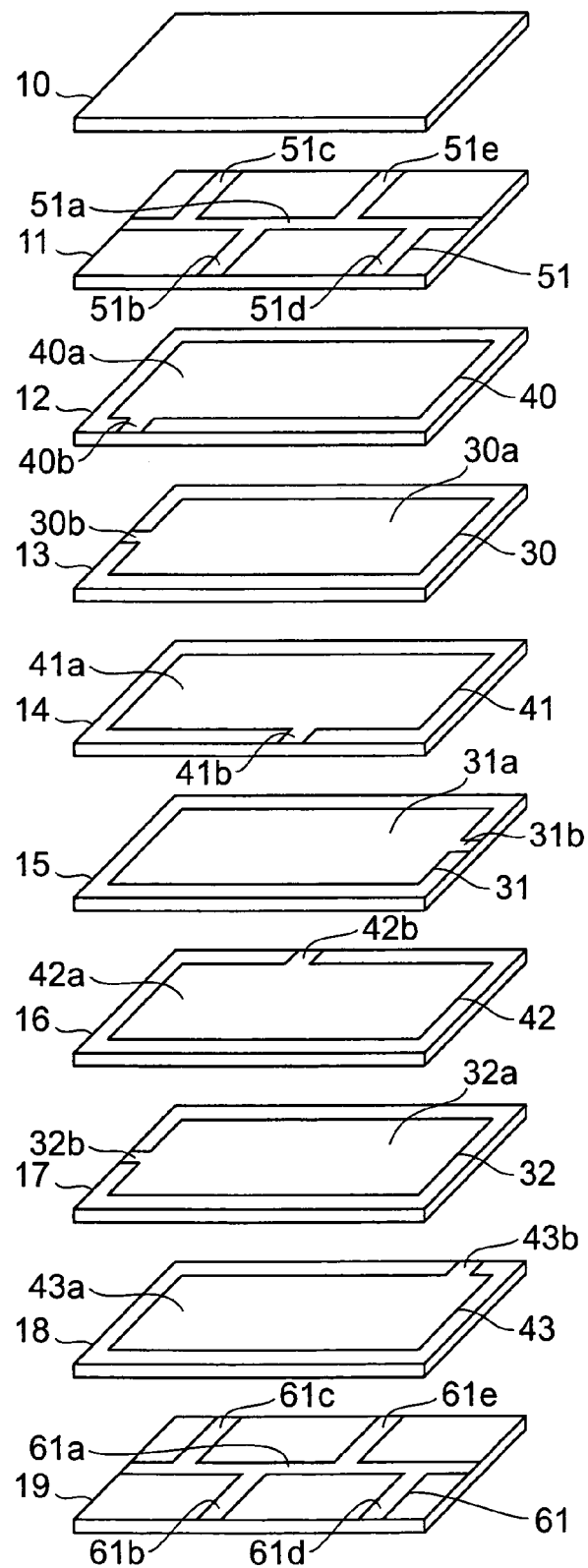
FIG. 17 is an exploded perspective view of the capacitor body included in the multilayer capacitor in accordance with a modified example of the first embodiment.

For example, a first inner connecting conductor may be included alone as the inner connecting conductor. Each of the first and second inner connecting conductors 51, 61, 52, 62 may be connected to a plurality of outer connecting conductors instead of only one outer connecting conductor. FIG. 17 shows a modified example of the first embodiment illustrating a case including only first inner connecting conductors as the inner connecting conductors while each first inner connecting conductor is connected to a plurality of outer connecting conductors. FIG. 17 is an exploded perspective view showing the capacitor body included in the multilayer capacitor in accordance with the first embodiment.

As shown in FIG. 17, the inner connecting conductor layers 50, 60 have only the first inner connecting conductors 51, 61 in the modified example of the first embodiment. The first inner connecting conductors 51, 61 are connected to the first outer connecting conductor 3 and second outer connecting conductor 4 electrically and physically. In the modified example of the first embodiment, the first inner connecting conductors 51, 61 include first conductor portions 51*a*, 61*a*, second conductor portions 51*b*, 61*b*, third conductor portions 51*c*, 61*c*, fourth conductor portions 51*d*, 61*d*, and fifth conductor portions 51*e*, 61*e*. Each of the first conductor portions 51*a*, 61*a* has an oblong form whose longer side direction is the longer side direction of the first and second main faces L1*a*, L1*b*, and extends from the first end face L1*c* to the second end face L1*d*. The first conductor portions 51*a*, 61*a* are drawn to both of the first and second end faces L1*c*, L1*d*. The first conductor portions 51*a*, 61*a* are connected to both of the first and second outer connecting conductors 3, 4 electrically and physically.

The second and fourth conductor portions 51*b*, 61*b*, 51*d*, 61*d* of the first inner connecting conductors 51, 61 extend from the longer sides on the first side face L1*e* side of the first conductor portions 51*a*, 61*a* to the first side face L1*e*, so as to be drawn to the first side face L1*e*. The second conductor portions 51*b*, 61*b* and fourth conductor portions 51*d*, 61*d* are electrically and physically connected to the first terminal electrodes 1A and 1B, respectively.

The third and fifth conductor portions 51*c*, 61*c*, 51*e*, 61*e* of the first inner connecting conductors 51, 61 extend from the longer sides on the second side face L1*f* side of the first conductor portions 51*a*, 61*a* to the second side face L1*f*, so as to be drawn to the second side face L1*f*. The third conductor portions 51*c*, 61*c* and fifth conductor portions 51*e*, 61*e* are electrically and physically connected to the first terminal electrodes 1C and 1D, respectively.

As with the multilayer capacitor C1, the modified example of the multilayer capacitor in accordance with the first embodiment can increase the equivalent series resistance as compared with a conventional multilayer capacitor in which all the first inner electrodes are physically connected to the first terminal electrodes.

In the modified example of the first embodiment, the first inner connecting conductors are connected to both of the first and second outer connecting conductors 3, 4 physically and electrically. Therefore, the modified example of the first embodiment can lower the equivalent series resistance as compared with the multilayer capacitor C1 in accordance with the first embodiment in which different inner connecting conductors are connected to the respective outer connecting conductors.

The modified example of the multilayer capacitor in accordance with the first embodiment can lower the equivalent series inductance as with the multilayer capacitor C1.

The embodiments other than the first embodiment can also be modified such as to connect the first inner connecting conductors 51, 61 to a plurality of outer connecting conductors.

For example, the number of laminated dielectric layers 10 to 19 and the number of laminated first and second inner electrodes 30 to 32, 40 to 43 are not limited to those in the above-mentioned embodiments and modified example. The number of inner connecting conductors 51, 52, 61, 62 and their positions within the capacitor body are not limited to those described in the above-mentioned embodiments and modified example.

The number of second terminal electrodes to which main electrode portions of the second inner electrodes are connected is not limited to the numbers described in the above-mentioned embodiments and modified example.

The forms of first inner connecting conductors 51, 61 are not limited to those described in the above-mentioned embodiments and modified example as long as they are connected to at least one of the plurality of first terminal electrodes 1A to 1D as well as the first outer connecting conductor 3. The forms of second inner connecting conductors 52, 62 are not limited to those described in the above-mentioned embodiments and modified example as long as they are connected to at least one of the plurality of second terminal electrodes 2A to 2D as well as the second outer connecting conductor 4.

The numbers of first and second terminal electrodes 1A to 1D, 2A to 2D are not limited to those described in the above-mentioned embodiments and modified example. For example, the first and second terminal electrodes may be provided one each, five or more each, or by numbers different from each other. The number of outer connecting conductors 3, 4 is not limited to that described in the above-mentioned embodiments. For example, one outer connecting conductor or three or more outer connecting conductors may be provided.

The positions of first and second terminal electrodes 1A to 1D, 2A to 2D and first and second outer connecting conductors 3, 4 are not limited to those described in the above-mentioned embodiments and modified example as long as they are formed on the outer surface of the capacitor body.

There may be no first and second terminal electrodes alternately arranged on the outer surface of the capacitor body when seen in the opposing direction of the first and second inner electrodes.

The above embodiments are applicable in various cases such as CPU applications, decoupling for sever boards for damping out power plane ringing, stabilizing power supply circuits and the like.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a capacitor body having a dielectric characteristic;
   a plurality of first and second inner electrodes alternately arranged in the capacitor body so as to oppose each other with at least a portion of the capacitor body in between; and
   a first outer connecting conductor, a plurality of first terminal electrodes, and a plurality of second terminal electrodes arranged on an outer surface of the capacitor body;
   wherein each of the first inner electrodes has a first main electrode portion for forming a capacitance by cooperating with the second inner electrode and a first lead electrode portion for connecting the first main electrode portion to the first outer connecting conductor;
   wherein each of the second inner electrodes has a second main electrode portion for forming a capacitance by cooperating with the first inner electrode and a second lead electrode portion for connecting the second main electrode portion to at least one of the plurality of second terminal electrodes;
   wherein a first inner connecting conductor is arranged outside of at least one set of first and second inner electrodes in the plurality of first and second inner electrodes in the opposing direction of the first and second inner electrodes in the capacitor body; and
   wherein the first inner connecting conductor is connected to at least one first terminal electrode in the plurality of first terminal electrodes and the first outer connecting conductor.

2. A multilayer capacitor according to claim 1, wherein the second main electrode portion of each of the second inner electrodes is connected to only one second terminal electrode in the plurality of second terminal electrodes through the second lead electrode portion of the second inner electrode.

3. A multilayer capacitor according to claim 1, wherein each second inner electrode has second lead electrode portions by at least the same number as that of the plurality of second terminal electrodes, the second main electrode portion of the second inner electrode being connected to the plurality of second terminal electrodes through the plurality of second lead electrode portions of the second inner electrode.

4. A multilayer capacitor according to claim 1, wherein at least a part of the plurality of first and second terminal electrodes are alternately arranged on the outer surface of the capacitor body when seen in the opposing direction of the one set of first and second inner electrodes.

5. A multilayer capacitor comprising:
   a capacitor body having a dielectric characteristic;
   a plurality of first and second inner electrodes alternately arranged in the capacitor body so as to oppose each other with at least a portion of the capacitor body in between; and
   first and second outer connecting conductors, a plurality of first terminal electrodes, and a plurality of second terminal electrodes arranged on an outer surface of the capacitor body;

wherein each of the first inner electrodes has a first main electrode portion for forming a capacitance by cooperating with the second inner electrode and at least one first lead electrode portion of a first lead electrode portion for connecting the first main electrode portion to the first outer connecting conductor and a first lead electrode portion for connecting the first main electrode portion to the second outer connecting conductor;

wherein each of the second inner electrodes has a second main electrode portion for forming a capacitance by cooperating with the first inner electrode and a second lead electrode portion for connecting the second main electrode portion to at least one of the plurality of second terminal electrodes;

wherein first and second inner connecting conductors are arranged outside of at least one set of first and second inner electrodes in the plurality of first and second inner electrodes in the opposing direction of the first and second inner electrodes in the capacitor body;

wherein the first inner connecting conductor is connected to at least one first terminal electrode in the plurality of first terminal electrodes and the first outer connecting conductor; and wherein the second inner connecting conductor is connected to at least one first terminal electrode in the plurality of first terminal electrodes and the second outer connecting conductor.

6. A multilayer capacitor according to claim 5, wherein the second main electrode portion of each of the second inner electrodes is connected to only one second terminal electrode in the plurality of second terminal electrodes through the second lead electrode portion of the second inner electrode.

7. A multilayer capacitor according to claim 5, wherein each second inner electrode has second lead electrode portions by at least the same number as that of the plurality of second terminal electrodes, the second main electrode portion of the second inner electrode being connected to the plurality of second terminal electrodes through the plurality of second lead electrode portions of the second inner electrode.

8. A multilayer capacitor according to claim 5, wherein at least a part of the plurality of first and second terminal electrodes are alternately arranged on the outer surface of the capacitor body when seen in the opposing direction of the one set of first and second inner electrodes.

* * * * *